United States Patent Office 3,652,742
Patented Mar. 28, 1972

---

3,652,742
2,2-DICHLORO-VINYLPHOSPHORIC ACID ESTER AMIDES
Wilhelm Sirrenberg, Sprockhovel, Ingeborg Hammann, Cologne, Wolfgang Behrenz, Cologne-Stammheim, Wilhelm Stendel, Wuppertal-Vohwinkel, and Gunter Unterstenhofer, Opladen, Germany, assignors to Farbenfabriken Bayer Aktiengesellschaft, Leverkusen, Germany
No Drawing. Filed May 3, 1968, Ser. No. 726,554
Claims priority, application Germany, May 6, 1967, F 52,338
Int. Cl. C07f 9/24; A01n 9/36
U.S. Cl. 260—957
9 Claims

ABSTRACT OF THE DISCLOSURE 2,2-dichloro-vinyl-phosphoric acid ester amides having acaricidal properties of the formula $$RO-\overset{\overset{O}{\|}}{\underset{R_3NR_4}{P}}-OCH=CCl_2$$

wherein R is hydrocarbon, $R_3$ is hydrogen and $R_4$ is halogen and hydrocarbon.

---

The present invention relates to and has for its objects the provision for particular new methods of producing the novel intermediate compound O - (2,2 - dichloro-vinyl)-phosphoric acid ester dichloride and certain final compounds, i.e. 2,2-dichloro-vinyl-phosphoric acid ester amides, some of which are known and which possess arthropodicidal, e.g. insecticidal and acaricidal, properties, i.e. in a simple stepwise series of reactions; arthropodicidal compositions of such final compounds with dispersible solid and liquid carrier vehicles; and methods of using such final compounds to combat arthropods; with other and further objects of the invention becoming apparent from a study of the within specification and accompanying examples.

In German Pats. 944,430 and 975,072 there is described among other things the reaction of chloral with trialkylphosphites (IIa), which leads in the sense of the following equation to O,O-dialkyl-O-(2,2-dichloro-vinyl)-phosphoric acid esters (IIb) [Perkov's reaction]:

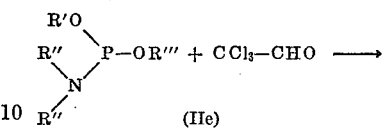

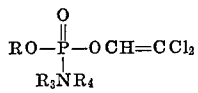

in which R' is an alkyl radical.

U.S. Pat. 2,744,128 as well as British Pats. 783,697; 784,985 and 784,986 also relate to the preparation of dichloro-vinyl esters of phosphoric acid (IIb') from trialkylphosphites (IIa') and chloral.

Moreover, there is known from German Pat. 968,486 a process for the preparation of O-(2-chloro-ethyl)-O-(2',2'-dichloro-vinyl)-phosphoric acid esters (IIc) by reaction of ring-form phosphites with chloral.

Further, the preparation of asymmetrical 2,2-dichloro-vinyl-phosphoric acid esters (IId) of the constitution stated above, that is of products in which the two radicals R' are different, has been described in the literature (see for example U.S. Pats. 2,956,073 and 3,116,201).

The obtaining of 2,2-dichloro-vinyl-phosphoric acid ester amides (Iaa) by reaction of the appropriate O,O-dialkylphosphorous acid ester N,N-dialkylamides (IIe) with chloral according to Perkov in the sense of the following equation is also already known (see V. S. Abramov and N. A. Iljina, "Doklady Akad. SSSR," vol. 132 (1960), page 823, reported in "Chemical Abstracts," vol. 54 (1960), column 22329g:

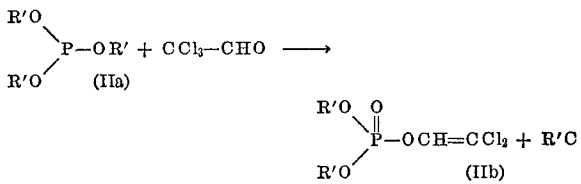

in which R', R" and R''' are identical or different, preferably lower alkyl, radicals.

If it is desired to prepare compounds of the last-mentioned type according to the Perkov process, phosphorous acid diester amides (IIe) are required, as can be seen from the above equation.

In this case, however, the known process exhibits a series of disadvantages.

The preparation of the phosphorous acid diester amides (IIe) required for the Perkov reaction is costly and difficult. As is known, the chlorine atoms in the starting phosphorus trichloride cannot be replaced exactly stepwise by different radicals in such a manner that the asymmetrical phosphites desired are obtained in good yields. Rather does the obtaining of these compounds make it necessary to isolate the O-alkyl-phosphorous acid dichloride (IIf) which is first obtained—which isolation is effected in most cases by distillation—in order to separate it from the by-products which are formed simultaneously. In the preparation of phosphorous acid diester amides (IIe) with different lower alkyl radicals, additional difficulties arise in that the boiling points of main product and by-product differ too little for a separation of the reaction mixture by distillation. The desired products are, rather, only accessible in a further mixture. In the preparation of mixed phosphorous acid diester amides (IIe) with different alkyl radicals of higher molecular weight, there arise in most cases considerable additional difficulties. In this case, the boiling point of the O-alkyl-phosphorous acid dichloride (IIf) of higher molecular weight which is to be prepared in the first step may lie so high that, at least when working on an industrial scale, a distillation purification of the aforesaid intermediate product is not practically possible or a decomposition during distillation is to be feared. Poor yields and impure end products are the result.

It has now been found in accordance with the present invention that 2,2-dichloro-vinyl-phosphoric acid ester amides, some of which are known and which possess arthropodicidal properties, having the general formula

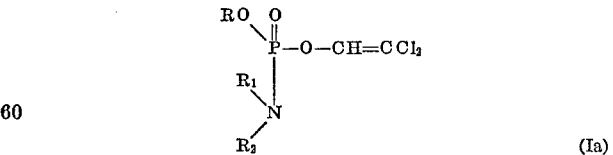

in which R is selected from the group consisting of $C_{1-12}$ alkyl; $C_{2-12}$ alkenyl; such alkyl and alkenyl which is substituted with substituents selected from the group consisting of lower alkoxy, phenoxy and 1-3 chloro; $C_{5-6}$ cycloalkyl; lower alkyl substituted $C_{5-6}$ cycloalkyl; $C_{5-6}$ cycloalkyl-lower alkyl; $C_{5-6}$ cycloalkenyl-lower alkyl; $C_{6-10}$ aryl; such aryl which is substituted with substituents selected from the group consisting of lower alkyl, 1-3 chloro, and mixtures of such alkyl and chloro substituents; and $C_{6-10}$ aryl-substituted lower alkyl; and $R_1$ and $R_2$ each respectively is selected from the group consisting of hydrogen; lower alkyl; lower alkenyl; such alkyl and alkenyl which is substituted with a substituent selected from the group consisting of lower alkoxy and lower alkylmercapto; $C_{5-6}$ cycloalkyl; $C_{6-10}$ aryl; and such aryl which is substituted with 1–3 chloro; with the proviso that $R_1$ and $R_2$ when taken together with the adjacent N atom represent a heterocyclic ring having 3–6 members including as hetero linking atom at least said adjacent N atom and at most said N atom and an O atom; can be obtained smoothly, in particularly high purity and with outstanding yield, by the process which comprises first Reacting an O,O-dialkyl-phosphoric acid ester selected from the group consisting of O,O-dimethyl-O-(2,2-dichloro-vinyl)-phosphoric acid ester and O,O-diethyl-O-(2,2-dichloro-vinyl)-phosphoric acid ester with a chlorine-contributing compound selected from the group consisting of (a) thionyl chloride in the presence of dimethyl formamide as catalyst, (b) phosphorus pentachloride, and (c) phosphorus trichloride and chlorine in stoichiometric amounts corresponding substantially to that of phosphorus pentachloride, to form O-(2,2-dichloro-vinyl)-phosphoric acid ester dichloride;

Second, reacting said ester dichloride with a hydroxy compound having the formula

R—OH in which R is the same as defined above, to form the corresponding 2,2-dichloro-vinyl-phosphoric ester monochloride having the formula $$\underset{\underset{Cl}{|}}{RO-\overset{\overset{O}{\|}}{P}}-O-CH=CCl_2 \qquad (IIg)$$

in which R is the same as defined above; and third, reacting said ester monochloride with a nitrogen compound having the formula $R_1$—HN—$R_2$ in which $R_1$ and $R_2$ each respectively is the same as defined above, to form the corresponding 2,2-dichloro-vinyl-phosphoric acid ester amide.

Specifically, O,O-dimethyl - O - (2,2-dichloro-vinyl)-phosphoric acid ester (IIba) or O,O-diethyl-O-(2,2-dichlorovinyl)-phosphoric acid ester (IIbb) is converted at 40–130° C., by means of phosphorus pentachloride (optionally in the presence of a catalyst such as dimethyl formamide) or by means of thionyl chloride in the presence of catalytic amounts of dimethyl formamide, into the hitherto unknown O-(2,2-dichlorovinyl)-phosphoric acid ester dichloride (III) and the latter is reacted stepwise, in the presence of acid-binding agents, with (possibly substituted) alcohols or phenols and with ammonia or primary or secondary amines to give the corresponding 2,2-dichlorovinyl-phosphoric acid diester amides of the above-mentioned Formula Ia.

The extremely smooth and uniform course of the reaction colulld not be foreseen, since it was to be expected that a mixture of chlorination products would be obtained. In particular, the remaining intact of the dichloro-vinyl group during the action of phosphorus pentachloride or thionly chloride is decidedly surprising since the latter adds halogen (i.e. serves as a halogen-addition agent) even under mild reaction conditions (see for example "Chemische Berichte," vol. 63, p. 11580 (1930); vol. 64, p. 1466 (1931); vol. 66, p. 278 (1933); vol. 87, p. 755 (1954); vol. 88, p. 662 (1955) as well as U.S. Pat. 2,971,882). The possibility of the addition of halogen to the double bond in the O,O-dimethyl-O-(2,2-dichloro-vinyl)-phosphoric acid ester (IIba) has also been described in the literature (see G. Schrader "Die Entwicklung neuer insektizider Phosphorsäureester," 3rd edition (1963), Verlag G.m.b.H., Weinheim, Bergstrasse, p. 46, ibidem further literature).

Compared to the methods which have up to now become known for the preparation of the type of substances under discussion, the process of the present invention exhibits a series of remarkable advantages. For example, the use of the phosphorous acid diester amides (IIe) which are difficult to prepare is avoided; instead, a start is made from O,O-dimethyl-(IIba) or O,O-diethyl-(IIbb) -O-(2,2-dichloro-vinyl)-phosphoric acid esters which are readily available even on an industrial scale, and from phosphorus pentachloride or thionyl chloride which are likewise obtainable, commercially. All steps of the reaction, in particular the chlorination, may proceed smoothly and can be readily carried out technologically. The O-(2,2-dichloro-vinyl)-phosphoric acid ester dichloride (III) which is formed as intermediate product can at present not be prepared in any other way and is thus a new compound.

Furthermore, by means of the instant new process a large number of new, technologically valuable 2,2-dichlorovinyl-phosphoric acid diester amides (Ia) can be obtained, which according to the methods described hitherto in the literature are either not accessible at all or only very difficulty accessible. Besides this great breadth of application, the instant process, compared to the known processes, is also distinguished in that it enables better yields and purer products to be obtained.

If O,O-dimethyl-O-(2,2-dichloro-vinyl)-phosphoric acid ester (IIa) and phosphorus pentachloride or thionyl chloride are used as starting materials, the course of the reaction according to the instant process is represented by the following reaction scheme:

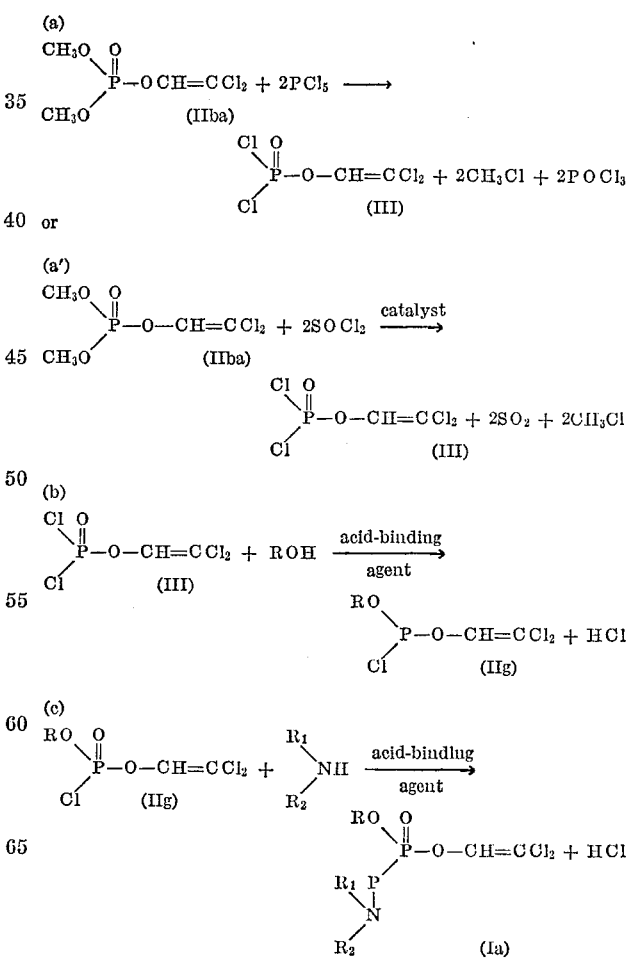

As can be seen from the above equations, in the reaction there are formed, in the first step, only slightly volatile by-products, namely methyl chloride and phosphorus oxychloride or sulfur dioxide.

The phosphorus pentachloride need not be added as such; the addition of phosphorus trichloride with the introduction of chlorine can achieve the same result.

In the aforesaid equations, the symbols R, $R_1$ and $R_2$ are the same as defined above.

As typical examples of primary and secondary amines to be reacted according to the present invention there may be listed: methyl, ethyl, n- and iso-propyl, n-, iso- and sec.-butyl, n- iso- and tert.-amyl,, 1,2,2-trimethylpropyl, pinacolyl, allyl, 2-methoxy-ethyl, 2-chloro- and 2,2,2-trichloro-ethyl, 2-ethylmercapto-ethyl, 2-diethylamino-ethyl, cyclopentyl, cyclohexyl, methyl-, dimethyl- and trimethyl-cyclohexyl, or benzyl, amine as well as the corresponding diamines. As aromatic amines, for the third step of the process according to the invention there can be used for example the following compounds: aniline, N-lower alkyl-anilines such as methyl- and ethyl-aniline, 2-, 3- and 4-chloro-, 2,4- and 2,5-dichloro-, 2,4,5- and 2,4,6-trichloro-, 2-chloro-4-methyl-, 3-chloro-4-methyl-, 3-methyl-4-chloro-, 2-chloro-4-tert.-butyl-aniline, 2, 3- and 4-nitro-aniline, 2- and 3-chloro-4-nitro-aniline, 2,5- and 3,5-dichloro-4-nitro-aniline, 2- and 3-methyl-4-nitro-aniline, 3-nitro-4-methyl-aniline, 2- and 3-methoxy-4-nitro-aniline, 3-nitro-4-chloro-, 3-nitro-, 4,6-dichloro-, 2-nitro-4-chloro-, 4-cyano- 2- and 3-methyl-4-cyano-, 4-thiocyano-, 2- and 3-methyl-4-thiocyano-, 4-methylmercapto-, 4-methyl-sulphoxyl-, 4-methyl-sulphonyl-, 3-methyl-4-methylmercapto-, 3,5-dimethyl-4-methylmercapto-, 3 - methyl-4-methyl-sulphoxyl-, 3-methyl-4-methyl-sulphonyl-aniline, further diphenylamine and its derivatives which are substituted in the nucleus in the manner stated above.

As heterocyclic amines there are suitable in particular: ethylenimine, pyrrolidine, piperidine, morpholine, thiomorpholine, pyrrole, pyrazole, imidazole, 1,2,3- and 1,2,4-triazole, 1,2,3,4- or 1,2,3,5-tetrazole, indole, carbazole, indazole, benzimidazole, purine and phenoxazine.

As examples of alcohols to be reacted according to the invention there are mentioned: methyl, ethyl, n-propyl, isopropyl, n-butyl, isobutyl, sec.-butyl, n-amyl, isoamyl, tert.-amyl, n-hexyl, 1,2,3-trimethylpropyl, pinacolyl, n-heptyl, n-octyl, n-dodecyl, allyl, 2-methoxyethyl, 2-ethoxyethyl, 2-n-butoxy-ethyl, 2-phenoxy-ethyl, 2-chloroethyl, 2,2,2 - trichloroethyl, 2 - ethylmercaptoethyl, 2 - diethylaminoethyl, cyclopentyl, cyclohexyl, methylcyclohexyl, dimethylcyclohexyl, trimethylcyclohexyl, benzyl or dichlorobenzyl alcohol as well as the corresponding mercaptans, and the like. Of phenols, for the second and/or third step of the process according to the invention there can be used, for example, the following compounds: phenol, 2-, 3- and 4-chloro-, 2,4-, 3,4- and 2,5-dichloro-, 2,4,5- and 2,4,6-trichloro-, 2-chloro-4-methyl-, 3-chloro-4-methyl-, 3-methyl-4-chloro-, 2-chloro-4-tert.butyl-, 2-, 3- and 4-nitro-, 2- and 3-chloro-4-nitro-, 2,5- and 3,5-dichloro-4-nitro-, 2- and 3-methyl-4-nitro-, 3-nitro-4-methyl-, 2- and 3-methoxy-4-nitro-, 3-nitro-4-chloro, 3-nitro-4,6-dichloro-, 2-nitro-4-chloro-, 4-cyano, 2- and 3-methyl-4-cyano, 4-thiocyano-, 2- and 3-methyl-4-thiocyano-, 4-methylmercapto-, 4-methyl-sulphoxyl-, 4-methyl-sulphonyl-, 3-methyl-4-methylmercapto-, 3,5-dimethyl-4-methylmercapto-, 3-methyl-4-methyl-sulphoxyl-, 3-methyl-4-methyl-sulphonyl-phenol, and the like.

The chlorination of the O,O-dimethyl-(IIba) or O,O-diethyl-(IIbb) -O-(2,2-dichloro - vinyl)-phosphoric acid ester takes place expediently in the absence of solvents, while the reaction of the O-(2,2-dichloro-vinyl)-phosphoric acid ester dichloride (III) with the appropriate alcohols or phenols and the appropriate primary or secondary amines is carried out preferably in the presence of solvents; this term includes mere diluents. As such, practically all inert organic solvents are suitable. These include preferably hydrocarbons, including aliphatic, aromatic and chloro-aromatic hydrocarbons, especially lower alkane, $C_{6-10}$ aromatic and chloro-aromatic hydrocarbons such as benzine, benzene, toluene, xylene or chloro-benzene; further, ethers, including aliphatic, especially di-lower alkyl and cycloaliphatic, especially cyclolower aliphatic ethers, for example diethyl or dibutyl ether, dioxan and tetrahydrofuran as well as low-boiling aliphatic ketones and nitriles, including lower aliphatic, especially lower alkyl, ketones and lower aliphatic, especially lower alkanoic, nitriles, for example acetone, methylethyl, methylisopropyl and methylisobutyl ketone, acetonitrile and propionitrile; and the like.

Moreover, the second and third steps are carried out preferably in the presence of acid-binding agents,. As such, there are suitable, above all, tertiary aliphatic, aromatic or heterocyclic amines, including tertiary alkyl, especially tertiary lower alkyl, amines and anilines, for example triethyl-amine, diethyl-aniline or pyridine, but also alkali metal carbonates, cyanides and alcoholates, e.g. lower alkanolates, such as potassium or sodium carbonate, cyanide, methylate and ethylate. Finally, it is also possible to use as acid acceptor a 100% excess of the respective primary or secondary amine to be reacted.

The first as well as the second and third step of the process according to the present invention can be carried out within a fairly wide temperature range. The first reaction chlorination takes place, in general, at substantially between about 40 to 130° C., preferably 70 to 120° C., while in the second and third reaction steps the work is carried out at low temperatures (e.g. substantially between about —10 to +20° C., preferably —5 to +10° C.).

As can be seen from the equations stated above, for each mol of O,O-dimethyl-(IIba) or O,O-diethyl-(IIbb) -O-(2,2-dichloro-vinyl)-phosphoric acid ester there are used, at least approximately 2 mols of phosphorus pentachloride or 2 to 4 mols of thionyl chloride and, in addition, per mol of O-(2,2-dichloro-vinyl)-phosphoric acid ester dichloride (III), in each case 1 mol of alcohol or phenol and 1 mol of ammonia or primary or secondary amine, as well as 2 mols of acid-binding agent.

Chlorination takes place expediently in such a manner that the calculated amount of phosphorus pentachloride (optionally in the presence of catalytic amounts of dimethyl formamide) is introduced portionwise, with stirring, into the O,O-dimethyl-(IIba) or O,O-diethyl-(IIbb) -O-(2,2-dichloro-vinyl)phosphoric acid ester at the reaction temperatures stated above, methyl or ethyl chloride escaping and, in addition, phosphorus oxychloride being formed as by-product.

Then, in order to complete the reaction, the reaction mixture is heated for a further ½ to 4 hours and the phosphorus oxychloride which is formed is then distilled off under reduced pressure. The O-(2,2-dichloro-vinyl)-phosphoric acid ester dichloride (III) which remains behind is pure enough for the ensuing reaction. If desired, it may, however, be distilled under reduced pressure without appreciable losses of yield.

According to a special method of carrying out the process, the O,O-dimethyl-(IIba) or O,O-diethyl-(IIbb) -O-(2,2-dichloro-vinyl)-phosphoric acid ester together with the equimolar amount of phosphorus trichloride are provided and into this mixture there is introduced approximately the calculated amount of elemental chlorine, so that the phosphorus trichloride and chlorine together correspond substantially stoichiometrically with phosphorus pentachloride.

When preparing the O-(2,2-dichloro-vinyl)-phosphoric acid ester dichloride (III) by reaction of O,O-dimethyl-(IIba) or O,O-diethyl-(IIbb) -O-(2,2 - dichloro - vinyl)-phosphoric acid ester with thionyl chloride, a mixture of these reaction components is heated for about 3 hours, in the presence of catalytic amounts of dimethyl formamide, to temperatures between 70 to 120° C., preferably 75 to 110° C.; an excess of thionyl chloride can serve as diluent. During the reaction, methyl or ethyl chloride and sulfur dioxide escape. After completion of the reaction, the volatile constituents, consisting mainly of excess thionyl chloride, are removed by distillation under reduced pressure.

The further reaction of the O - (2,2-dichloro-vinyl)- phosphoric acid ester dichloride (III) takes place expediently in such a manner that the latter is dissolved in a suitable solvent or diluent and to this solution there is added dropwise at the temperatures stated, with stirring, first a suitably cooled mixture of the alcohol or phenol, acid-binding agent and solvent concerned. The salt-like precipitate is then filtered off with suction and washed out with the solvent used. A mixture of ammonia or primary or secondary amine, solvent and acid-binding agent is then added dropwise to the filtrate, but the reverse sequence may also be chosen, and the reaction mixture is then further stirred for a short time at room temperature. The working up of the latter occurs in known manner by filtering off the precipitated salt, washing and neutralization of the filtrate, drying thereof, evaporation of the solvent, preferably under reduced pressure and, optionally, fractional distillation of the residue.

The 2,2-dichloro-vinyl-phosphoric acid ester amides (Ia) obtained remain behind in most cases in the form of colorless to slightly yellow colored oils, some of which can be distilled under greatly reduced pressure without decomposition and, in addition, can be unambiguously characterized on the basis of their refractive index, the thin-layer chromatogram and the values for the elementary analysis. Sometimes, however, they are also obtained as crystalline substances with sharp melting point.

As already mentioned above, for the most part new compounds are usable as insecticides and acaricides; they possess a rapidly-commencing and long-lasting pesticidal effectiveness, with comparatively low toxicity to warm-blooded animals and comparatively low phytotoxicity.

A feature of the present invention is the provision of a group of new compounds which are very useful as insecticides or acardicides and which can be prepared by the instant new process. These new compounds have the general formula:

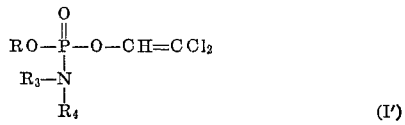

in which R is selected from the group consisting of $C_{1-12}$ alkyl; $C_{2-12}$ alkenyl; such alkyl and alkenyl which is substituted with substituents selected from the group consisting of lower alkoxy, phenoxy and 1–3 chloro; $C_{5-6}$ cycloalkyl; lower alkyl substituted $C_{5-6}$ cycloalkyl; $C_{5-6}$ cycloalkyl-lower alkyl; $C_{5-6}$ cycloalkenyl-lower alkyl; $C_{6-10}$ aryl; such aryl which is substituted with substituents selected from the group consisting of lower alkyl, 1–3 chloro, and mixtures of such alkyl and chloro substituents; and $C_{6-10}$ aryl-substituted lower alkyl; $R_3$ is hydrogen; and $R_4$ is selected from the group consisting of hydrogen; lower alkyl; lower alkenyl; such alkyl and alkenyl which is substituted with a substituent selected from the group consisting of lower alkoxy and lower alkylmercapto; $C_{5-6}$ cycloalkyl; $C_{6-10}$ aryl; and such aryl which is substituted with 1–3 chloro; with the proviso that $R_3$ and $R_4$ when taken together with the adjacent N atom represent a heterocyclic ring having 3–6 members including as hetero linking atom at least said adjacent N atom and at most said N atom and an O atom.

The 2,2-dichloro-vinyl-phosphoric acid diester amides (Ia—including I') are used with success for the control of noxious sucking and biting insects, Diptera as well as mites, particularly in plant protection and the protection of stored products, and also in the hygiene field.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the current gall aphid (*Cryptomyzus korschelti*), the mealy apple aphid (*Sappaphis mali*), the plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape-mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortirix viridana*), the fall armyworm (*Laphygma frugiperda*) and cotton worm (*Prodenia litura*), the ermine moth (*Hyponomeuta padella*), the Mediterranean flour moth (*Ephestia Kuhniella*) and greater wax moth (*Galleria mellonella*); and the like. Also to be classed with the biting insects are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), but also species living in the soil, for example wireworms (Agriotes spec.) and larvae of the cockchafer (*Melolontha melolonthia*); cockroaches, such as the German cockroach (*Blatella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further Orthoptera, for example the house cricket (*Acheta domestica*; termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed in particular, the spider mites (Tetranychidae) such as the two-spotted spider mite (*Tetranychus telarius=Tetranychus althaeae* or *Tetranychus urticae*) and the European red mite (*Paratetranychus pilosus=Panonychus ulmi*), blister mites, for example the currant blister mite (*Eriophyes ribis*) and tarsonemids, for example the broad mite (*Hemitarsonemus latus*) and the cyclamen mite (*Tasonemus pallidus*); finally, ticks, such as the relapsing fever tick (*Ornithodorus moubata*); and the like.

The particular active compounds produced according to the instant invention can be utilized, if desired, in the form of the usual formulations or compositions with diluents or extenders, i.e. dispersible carrier vehicles, such as solutions, emulsions, suspensions, emulsifiable concentrates, spray powders, pastes, soluble powders, dusting agents, granules, etc. These are prepared in known manner, for instance by extending the active compounds with dispersible liquid diluent carriers and/or dispersible solid carriers optionally with the use of carrier vehicle assistants, e.g. surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), ketones (e.g. acetone, etc.), and/or water; as well as dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds produced according to the instant invention may be employed alone or in the form of mixtures with one another and/or with such solid and/or liquid dispersible carrier vehicles and/or with other known compatible active agents, especially plant protection agents, such as other acaricides, insecticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a dispersible carrier vehicle such as (1) a dispersible carrier solid, and/or (2) a dispersible carrier liquid preferably including a carrier vehicle assistant, e.g. surface-active agent, such as an emulsifying agent and/or a dispersing agent, and an amount of the active compound which is effective for the purpose in question and which is generally between about 0.00001–95%, and preferably 0.01–95%, by weight of the mixture.

Furthermore, the present invention contemplates methods of selectively controlling or combating arthropods, which comprises applying to at least one of (a) such arthropods and (b) their habitat, i.e. the locus to be protected, a combative amount, i.e. an insecticidally and/or acaricidally effective amount, of the particular active compound of the invention alone or together with a carrier vehicle as noted above. The instant formulations or compositions are applied in the usual manner, for instance by spraying, atomizing, vaporizing, fumigation, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges.

Surprisingly, the products of the instant process, compared with the active compounds of analogous constitution and the same kind of activity hitherto known from the literature, are distinguished by a much better effectiveness, with considerably lower toxicity to warm-blooded animals and a concomitantly low phytotoxicity. They therefore represent a genuine enrichment of the art. This unexpected superiority, as well as the outstanding activity of the compounds which can be prepared according to the instant process when used against a multiplicity of pests and animal parasites can be seen from the experimental results in the following examples.

EXAMPLE 1

Phaedon larvae test

Solvent: 3 parts by weight acetone
Emulsifier: 1 part by weight alkylaryl polyglycol ether To produce a suitable preparation of the particular active compound, 1 part by weight of such active compound is mixed with the stated amount of the respective solvent containing the stated amount of emulsifier, and the concentrate obtained is diluted with water to the desired final concentration.

Cabbage leaves (*Brassica oleracea*) are sprayed with this preparation of the given active compound until dripping wet and then infested with mustard bettle larvae (*Phaedon cochleariae*).

After the period of time stated in the following table, the degree of destruction of the pests is determined and expressed as a percentage: 100% means that all, and 0% means that none, of the bettle larvae are killed.

The particular active compounds tested, their concentrations, the evaluation time and the experimental results obtained can be seen from the following Table 1:

TABLE 1

| Active compound | | Concentration of active compound in percent | Degree of destruction in percent after 3 days |
|---|---|---|---|
| (IVa$_1$) | 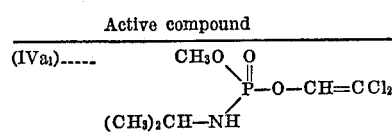 | 0.1<br>0.01<br>0.001 | 100<br>100<br>90 |
| (V$_1$) | 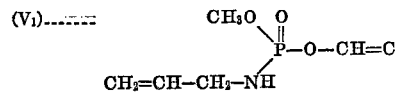 | 0.1<br>0.01 | 100<br>100 |

TABLE 1—Continued

| Active compound | Concentration of active compound in percent | Degree of destruction in percent after 3 days |
|---|---|---|
| (VI$_1$) CH$_3$O—P(=O)(N(CH$_3$)CH$_2$)—O—CH=CCl$_2$ | 0.1<br>0.01<br>0.001 | 100<br>100<br>60 |
| (VII$_1$) CH$_3$O—P(=O)(NH—CH$_3$)—OCH=CCl$_2$ | 0.1<br>0.01 | 100<br>100 |
| (VIII$_1$) CH$_3$O—P(=O)(NH—C$_6$H$_5$)—OCH=CCl$_2$ | 0.1<br>0.01 | 100<br>100 |
| (IXa$_1$) C$_6$H$_5$—O—P(=O)(N(CH$_3$)$_2$)—OCH=CCl$_2$ | 0.1<br>0.01 | 100<br>100 |
| (Xa$_1$) C$_6$H$_5$—O—P(=O)(N(C$_2$H$_5$)$_2$)—OCH=CCl$_2$ | 0.1 | 100 |

EXAMPLE 2

Drosophila test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

1 cc. of the preparation of the given active compound is applied with a pipette to a filter paper disc of 7 cm. diameter. The wet disc is placed in a glass vessel containing 50 vinegar flies (*Drosophila melanogaster*) and covered with a glass plate. After the specified period of time, the destruction is determined as a percentage: 100% means that all the flies are killed; 0% means that none of the flies are killed.

The particular active compounds, their concentrations, the evaluation time and the degree of destruction can be seen from the following Table 2:

TABLE 2

| Active compound | Concentration of active compound in percent | Degree of destruction in percent after 24 hours |
|---|---|---|
| (IVa$_2$) CH$_3$O—P(=O)(NH—CH(CH$_3$)$_2$)—O—CH=CCl$_2$ | 0.1<br>0.01<br>0.001<br>0.0001 | 100<br>100<br>100<br>90 |
| (V$_2$) CH$_3$O—P(=O)(NH—CH$_2$—CH=CH$_2$)—O—CH=CCl$_2$ | 0.1<br>0.01<br>0.001 | 100<br>100<br>100 |
| (XIa$_1$) CH$_3$O—P(=O)(N(C$_2$H$_5$)$_2$)—O—CH=CCl$_2$ | 0.1<br>0.01<br>0.001 | 100<br>100<br>100 |
| (XII$_1$) CH$_3$O—P(=O)(piperidino)—O—CH=CCl$_2$ | 0.1<br>0.01 | 100<br>100 |
| (XIII$_1$) CH$_3$O—P(=O)(morpholino)—O—CH=CCl$_2$ | 0.1<br>0.01<br>0.001 | 100<br>100<br>100 |

TABLE 2—Continued

| Active compound | Concentration of active compound in percent | Degree of destruction in percent after 24 hours |
|---|---|---|
| (VI$_2$) 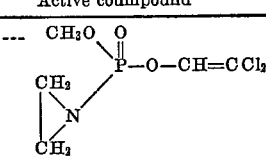 | 0.1<br>0.01<br>0.001 | 100<br>100<br>100 |
| (VII$_2$) 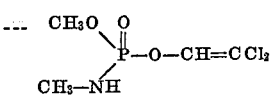 | 0.1<br>0.01<br>0.001 | 100<br>100<br>100 |
| (VIII$_2$) 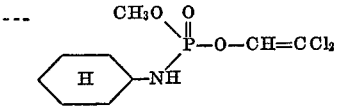 | 0.1<br>0.01 | 100<br>100 |
| (IX$a_2$) 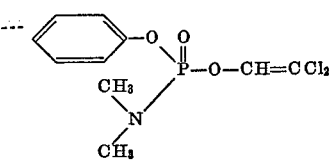 | 0.1<br>0.01 | 100<br>100 |
| (X$a_2$) 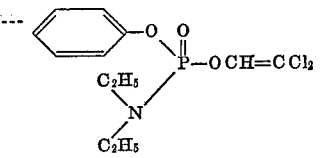 | 0.1 | 100 |

EXAMPLE 3

Myzus test (contact action)

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Cabbage plants (*Brassica oleracea*) which have been heavily infested with peach aphids (*Myzus persicae*) are sprayed with the preparation of the given active compound until dripping wet.

After the specified period of time, the degree of destruction is determined as a percentage: 100% means that all the aphids are killed whereas 0% means that none of the aphids are killed.

The particular active compounds, their concentrations, the evaluation time and the results obtained can be seen from the following Table 3:

TABLE 3

| Active compound | Concentration of active compound in percent | Degree of destruction in percent after 24 hours |
|---|---|---|
| (IV$a_3$) 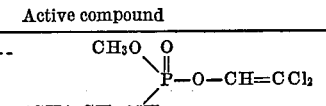 | 0.1<br>0.01 | 100<br>95 |
| (V$_3$) 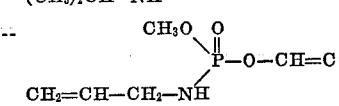 | 0.1<br>0.01 | 100<br>95 |
| (VI$_3$) 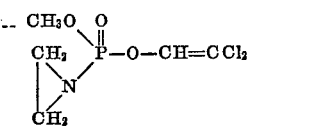 | 0.1<br>0.01 | 100<br>99 |
| (VII$_3$) 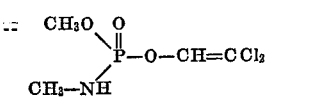 | 0.1<br>0.01 | 100<br>99 |
| (IX$a_3$) 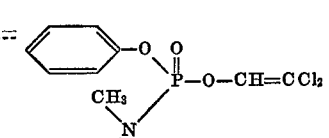 | 0.1<br>0.01 | 100<br>60 |

TABLE 3—Continued

| Active compound | Concentration of active compound in percent | Degree of destruction in percent after 24 hours |
|---|---|---|
| (Xa₃) 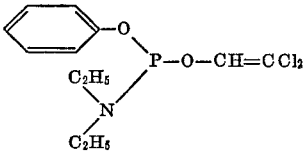 | 0.1 | 95 |

EXAMPLE 4

Tetranychus test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the concentrate so obtained is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus telarius*) in all stages of development.

After the specified period of time, the effectiveness of the active compound preparation is determined by counting the dead mites. The degree of destruction thus obtained is expressed as a percentage: 100% means that all the spider mites are killed whereas 0% means that none of the spider mites are killed.

The particular active compounds, their concentrations, the evaluation time and the results obtained can be seen from the following Table 4:

EXAMPLE 5

Rhopalosiphum test (systemic action)

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Oat plants (*Avena sativa*) which have been strongly infested with oat aphids (*Rhopalosiphum padi*) are watered with the preparation of the given active compound so that the preparation penetrates into the soil without wetting the leaves of the oat plants. The active compound is taken up by the oat plants from the soil and thus reaches the infested leaves.

After the specified period of time, the degree of destruction is determined as a percentage: 100% means that all the aphids are killed whereas 0% means that none of the aphids are killed.

The particular active compounds, their concentrations,

TABLE 4

| Active compound | Concentration of active compound in percent | Degree of destruction in percent after 48 hours |
|---|---|---|
| (IVa₄) 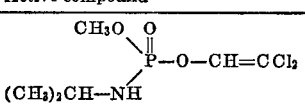 | 0.1<br>0.01 | 100<br>100 |
| (V₄) 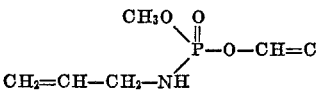 | 1.0<br>0.01 | 100<br>95 |
| (VII₄) 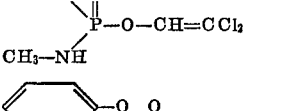 | 0.1<br>0.01 | 100<br>80 |
| (IXa₄) 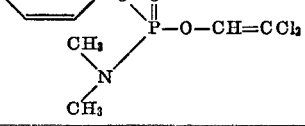 | 0.1<br>0.01 | 100<br>100 | the evaluation time and the results obtained can be seen from the following Table 5:

TABLE 5

| Active compound | | Concentration of active compound in percent | Degree of destruction in percent after 4 days |
|---|---|---|---|
| (IVa$_5$) | $CH_3O$ \ $\underset{(CH_3)_2CH-NH}{P}$ – O – CH=CCl$_2$ (with P=O) | 0.1 <br> 0.01 | 100 <br> 100 |
| (V$_5$) | $CH_3O$ \ $\underset{CH_2=CH-CH_2-NH}{P}$ – O – CH=CCl$_2$ (with P=O) | 0.1 <br> 0.01 | 100 <br> 95 |
| (XIa$_3$) | $CH_3O$ \ $\underset{(C_2H_5)_2N}{P}$ – O – CH=CCl$_2$ (with P=O) | 0.1 | 100 |
| (XII$_2$) | $CH_3O$ \ P(=O) – O – CH=CCl$_2$ with piperidinyl N | 0.1 | 100 |
| (XIII$_2$) | $CH_3O$ \ P(=O) – O – CH=CCl$_2$ with morpholinyl N | 0.1 | 100 |
| (VI$_4$) | $CH_3O$ \ $\underset{CH_2-N-CH_2}{CH_2 \; P}$ – O – CH – CCl$_2$ (with P=O) | 0.1 | 100 |
| (VII$_5$) | $CH_3O$ \ $\underset{CH_3-NH}{P}$ – O – CH=CCl$_2$ (with P=O) | 0.1 <br> 0.01 | 100 <br> 100 |

EXAMPLE 6

LT$_{100}$ test for diptera

Test insects: House flies (*Musca domestica*)
Solvent: Acetone 2 parts by weight of the particular active compound are dissolved in 1000 parts by volume of solvent. The solution so obtained is diluted with further solvent to the desired lower concentrations.

2.5 ml. of the solution of the given active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is continuously observed. The time which is necessary for a 100% knock down effect is determined (LT$_{100}$).

The particular active compounds, their concentrations and the period of time at which there is a 100% knock down effect can be seen from the following Table 6:

TABLE 6

| Active compound | | Concentration of active compound in percent | LT$_{100}$ in minutes (′) or hours (h) |
|---|---|---|---|
| (IVa$_4$) | $CH_3O$ \ $\underset{(CH_3)_2CH-NH}{P}$ – O – CH=CCl$_2$ (with P=O) | 0.2 <br> 0.02 <br> 0.002 <br> 0.0002 | 15′ <br> 40′ <br> 105′ <br> 8h =50% |
| (XIa$_3$) | $CH_3O$ \ $\underset{(C_2H_5)_2N}{P}$ – O – CH=CCl$_2$ (with P=O) | 0.2 <br> 0.02 <br> 0.002 | 55′ <br> 190′ <br> 8h =50% |
| (XII$_2$) | $CH_3O$ \ P(=O) – O – CH=CCl$_2$ with piperidinyl N | 0.2 <br> 0.02 <br> 0.002 | 25′ <br> 80′ <br> 8h =50% |
| (XIII$_2$) | $CH_3O$ \ P(=O) – O – CH=CCl$_2$ with morpholinyl N | 0.2 <br> 0.02 <br> 0.002 <br> 0.0002 | 15′ <br> 25′ <br> 130′ <br> 8h =70% |

TABLE 6—Continued

| Active compound | Concentration of active compound in percent | $LT_{100}$ in minutes (') or hours (h) |
|---|---|---|
| (VI₅) CH₃O, CH₂ \P(=O)−O−CH=CCl₂, N−CH₃ | 0.2<br>0.02<br>0.002<br>0.0002 | 10'<br>15'<br>60'<br>240' |
| (V₆) CH₃O, NH \P(=O)−O−CH=CCl₂, CH₂=CH−CH₂ | 0.2<br>0.02<br>0.002<br>0.0002 | 20'<br>35'<br>220'<br>8h =60% |
| (IXa₅) C₆H₅−O, CH₃ \P(=O)−OCH=CCl₂, N−CH₃ | 0.1<br>0.01 | 100'<br>8h |
| (Xa₄) C₆H₅−O, C₂H₅ \P(=O)−OCH=CCl₂, N−C₂H₅ | 0.1<br>0.01<br>0.001 | 55'<br>115'<br>8h =60% |

EXAMPLE 7

LT₁₀₀ test for diptera

Test insects: Yellow fever mosquitoes (*Aedes aegypti*)
Solvent: Acetone 2 parts by weight of the particular active compound are dissolved in 1000 parts by volume of solvent. The solution so obtained is diluted with further solvent to the desired lower concentrations.

2.5 ml. of the solution of the given active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is continuously observed. The time which is necessary for a 100% knock down effect is determined, and this is stated as $LT_{100}$.

The particular active compounds, their concentrations and the period of time at which there is a 100% knock down effect can be seen from the following Table 7:

TABLE 7

| Active compound | Concentration of active compound in percent | $LT_{100}$ in minutes |
|---|---|---|
| (IVa₇) CH₃O, (CH₃)₂CH−NH \P(=O)−O−CH=CCl₂ | 0.2<br>0.02<br>0.002 | 60<br>60<br>120 |
| (XIa₄) CH₃O, (C₂H₅)₂N \P(=O)−O−CH=CCl₂ | 0.2<br>0.02<br>0.002 | 60<br>60<br>180 =90% |
| (XII₄) CH₃O, C₆H₁₁−NH \P(=O)−O−CH=CCl₂ | 0.2<br>0.02<br>0.002 | 60<br>60<br>180 =80% |
| (XIII₄) CH₃O, morpholino−N \P(=O)−O−CH=CCl₂ | 0.2<br>0.02<br>0.002 | 60<br>60<br>180 |
| (VI₆) CH₃O, CH₃ \P(=O)−O−CH=CCl₂, N−CH₃ | 0.2<br>0.02<br>0.002<br>0.0002<br>0.00002 | 60<br>60<br>60<br>180<br>180 =80% |
| (V₇) CH₃O, CH₂=CH−CH₂−NH \P(=O)−O−CH=CCl₂ | 0.2<br>0.02<br>0.002<br>0.0002 | 60<br>60<br>180<br>180 =70% |

TABLE 7—Continued

| Active compound | | Concentration of active compound in percent | $LT_{100}$ in minutes |
|---|---|---|---|
| ($IXa_4$) | phenyl-O-P(=O)(N(CH$_3$)CH$_3$)-O-CH=CCl$_2$ | 0.1<br>0.01 | 60<br>120 |
| ($Xa_5$) | phenyl-O-P(=O)(N(C$_2$H$_5$)C$_2$H$_5$)-O-CH=CCl$_2$ | 0.1<br>0.01 | 60<br>60 |

EXAMPLE 8

$LD_{100}$ test

Test insects: Oriental cockroaches (*Blatta orientalis*)
Solvent: Acetone 2 parts by weight of the particular active compound are dissolved in 1000 parts by volume of the solvent. The solution so obtained is diluted with further solvent to the desired concentrations.

2.5 ml. of the solution of the given active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed after 1 and 3 days after the commencement of the experiments. The knock down effect is determined as a percentage, and this is stated as $LD_{100}$.

The particular active compounds, their concentrations and the results obtained can be seen from the following Table 8:

TABLE 8

| Active compound | | Concentration of active compound in percent | Knock-down effect ($LD_{100}$) in percent after 72 hours |
|---|---|---|---|
| ($IVa_8$) | CH$_3$O-P(=O)(NH-CH(CH$_3$))-O-CH=CCl$_2$ | 0.2<br>0.02<br>0.002 | 100<br>100<br>60 |
| ($XIa_5$) | CH$_3$O-P(=O)(N(C$_2$H$_5$)$_2$)-O-CH=CCl$_2$ | 0.2<br>0.02 | 100<br>60 |
| ($XII_5$) | CH$_3$O-P(=O)(piperidinyl)-O-CH=CCl$_2$ | 0.2 | 100 |
| ($XIII_5$) | CH$_3$O-P(=O)(morpholinyl)-O-CH=CCl$_2$ | 0.2 | 100 |
| ($VI_7$) | CH$_3$O-P(=O)(N(CH$_3$)CH$_3$)-OCH=CCl$_2$ | 0.2<br>0.02<br>0.002 | 100<br>100<br>30 |
| ($V_8$) | CH$_3$O-P(=O)(NH-CH$_2$-CH=CH$_2$)-O-CH=CCl$_2$ | 0.2<br>0.02 | 100<br>60 |
| ($IXa_7$) | phenyl-O-P(=O)(N(CH$_3$)CH$_3$)-O-CH=CCl$_2$ | 0.1 | 60 |
| ($Xa_8$) | phenyl-O-P(=O)(N(C$_2$H$_5$)C$_2$H$_5$)-O-CH=CCl$_2$ | 0.1 | 60 | and the results obtained can be seen from the following Table 9:

TABLE 9

| Active compound | | Concentration of active compound in percent | Knock-down effect (LD$_{100}$) in percent after 72 hours |
|---|---|---|---|
| (IVa$_9$) | CH$_3$O\\P(=O)/O—CH=CCl$_2$ with (CH$_3$)$_2$CHNH | 0.2<br>0.02 | 100<br>100 |
| (XIa$_4$) | CH$_3$O\\P(=O)/O—CH=CCl$_2$ with (C$_2$H$_5$)$_2$N | 0.2<br>0.02 | 100<br>30 |
| (XIII$_6$) | CH$_3$O\\P(=O)/O—CH=CCl$_2$ with morpholino | 0.2<br>0.02 | 100<br>90 |
| (VI$_8$) | CH$_3$O\\P(=O)/O—CH=CCl$_2$ with CH$_2$—N—CH$_2$ (piperazine) | 0.2<br>0.02 | 100<br>100 |
| (V$_9$) | CH$_3$O\\P(=O)/O—CH=CCl$_2$ with CH$_2$=CH—CH$_2$—NH | 0.2<br>0.02<br>0.002 | 100<br>100<br>50 |
| (IXa$_8$) | C$_6$H$_5$—O\\P(=O)/O—CH=CCl$_2$ with CH$_3$—N—CH$_3$ | 0.1 | 100 |

EXAMPLE 9

LD$_{100}$ test

Test insects: Granary weevils (*Sitophilus granarius*)
Solvent: Acetone 2 parts by weight of the particular active compound are dissolved in 1000 parts by volume of the solvent. The solution so obtained is diluted with further solvent to the desired final concentrations.

2.5 ml. of the solution of the given active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed after 1 and 3 days after the commencement of the experiments. The knock down effect is determined as a percentage (LD$_{100}$).

The particular active compounds, thier concentrations

EXAMPLE 10

Mosquito larvae test

Test insects: Yellow fever mosquito larvae (*Aedes aegypti*)
Solvent: 99 parts by weight acetone
Emulsifier: 1 part by weight benzylhydroxydiphenyl polyglycol ether To produce a suitable preparation of the particular active compound, 2 parts by weight of such active compound are dissolved in 1000 parts by volume of the solvent containing the amount of emulsifier stated above. The solution thus obtained is diluted with water to the desired lower concentrations.

The aqueous preparations of the given active compounds are placed in glass vessels and about 25 mosquito larvae are then placed in each glass vessel.

After 24 hours, the degree of destruction is determined as a percentage. 100% means that all the larvae are killed. 0% means that no larvae at all are killed.

The particular active compounds, their concentrations and the results obtained can be seen from the following Table 10:

TABLE 10

| Active compound | | Concentration of active compound in percent | Degree of destruction in percent |
|---|---|---|---|
| (IVa$_{10}$) | CH$_3$O\\P(=O)/O—CH=CCl$_2$ with (CH$_3$)$_2$CH—NH | 0.001<br>0.0001 | 100<br>80 |
| (XII$_6$) | CH$_3$O\\P(=O)/O—CH=CCl$_2$ with cyclohexyl-NH | 0.001 | 100 |

TABLE 10—Continued

| Active Compound | Concentration of active compound in percent | Degree of destruction in percent |
|---|---|---|
| ($XIII_7$) $CH_3O\!\!\diagdown_{\!\!\!\!O}\!\!\diagup P(=O)-O-CH=CCl_2$ (morpholino) | 0.001<br>0.0001 | 100<br>30 |
| ($VI_9$) $CH_3O,\ CH_3-N(CH_3)\diagdown P(=O)-O-CH=CCl_2$ | 0.001<br>0.0001 | 100<br>100 |
| ($V_{10}$) $CH_3O,\ CH_2=CH-CH_2-NH\diagdown P(=O)-O-CH=CCl_2$ | 0.001<br>0.0001 | 100<br>100 |
| ($IX a_9$) $C_6H_5-O,\ CH_3-N(CH_3)\diagdown P(=O)-O-CH=CCl_2$ | 0.001<br>0.0001<br>0.00001 | 100<br>100<br>30 |
| ($X a_7$) $C_6H_5-O,\ C_2H_5-N(C_2H_5)\diagdown P(=O)-O-CH=CCl_2$ | 0.001<br>0.0001<br>0.00001 | 100<br>100<br>30 |

EXAMPLE 11

Tick test

Test insects: *Boophilus microplus*
Solvent: 35 parts by weight ethylglycol monomethyl ether
Emulsifier: 35 parts by weight nonylphenol polyglycol ether To produce a suitable formulation, three parts by weight of the particular active compound are mixed with seven parts of the above-mentioned solvent-emulsifier mixture and the emulsion concentrate so obtained is diluted with water to the concentration desired in each case.

Gorged female ticks of differently sensitive strains of *Boophilus microplus* are immersed for 1 minute in these preparations of active compound. After immersion, these ticks are transferred to Petri dishes, the bottom of which is covered with a correspondingly large disc of filter paper.

The effectiveness of the preparation is determined 7 days later by ascertaining the amount of eggs deposited. The degree of effectiveness found in this manner is expressed as a percentage, 100% meaning that there was a one hundred percent inhibition of the depositing of eggs, and 0% signifying that the treated ticks showed no sign of an inhibition of egg-depositing.

The particular active compounds investigated, their concentrations, the parasites tested and the findings obtained can be seen from the following Table 11:

TABLE 11
Inhibition of the depositing of eggs in the case of *Boophilus microplus* (in percent)

| Active compound | Concentration of active compound in p.p.m. | Sensitive strain | Ridgeland strain | Biarra strain |
|---|---|---|---|---|
| $CH_3-CH_2-\underset{\underset{CH_3}{\mid}}{\overset{\overset{CH_3}{\mid}}{C}}-CH_2-O-\underset{\underset{NH-CH_2-CH=CH_2}{\mid}}{\overset{\overset{O}{\parallel}}{P}}-O-CH=CCl_2$ <br> ($XIV_1$) | 10,000<br>3,000<br>1,000<br>300<br>100<br>30<br>10<br>3<br>1 | <br><br><br><br><br><br><br><br> | 100<br>100<br>100<br>100<br>100<br>>50<br><br><br> | 100<br>100<br>100<br>100<br>>50<br><50<br><br><br> |
| $CH_3-(CH_2)_3-\underset{\underset{CH_3}{\mid}}{\overset{\overset{CH_3}{\mid}}{C}}-CH_2-O-\underset{\underset{NH-CH_2-CH-CH_3}{\mid}}{\overset{\overset{O}{\parallel}}{P}}-O-CH=CCl_2$ <br> ($XV_1$) | 10,000<br>3,000<br>1,000<br>300<br>100<br>30<br>10<br>3<br>1 | 100<br>100<br>100<br>100<br>100<br>>50<br><50<br>0<br>0 | 100<br>100<br>100<br>100<br>100<br>100<br>>50<br>>50<br>0 | 100<br>100<br>100<br>>50<br>>50<br>0<br>0<br>0<br>0 |
| $CH_3-(CH_2)_4-O-\underset{\underset{CH_3-CH_2-NH}{\mid}}{\overset{\overset{O}{\parallel}}{P}}-O-CH=CCl_2$ <br> ($XVI_1$) | 10,000<br>3,000<br>1,000<br>300<br>100<br>30<br>10 | 100<br>100<br>>50<br>>50<br><50<br>0<br>0 | 100<br>100<br>100<br>100<br><50<br>0<br>0 | 100<br>100<br>>50<br>>50<br>0<br>0<br>0 |

TABLE 11—Continued

Inhibition of the depositing of eggs in the case of *Boophilus microplus* (in percent)—Continued

| Active compound | Concentration of active compound in p.p.m. | Sensitive strain | Ridgeland strain | Biarra strain |
|---|---|---|---|---|
| $CH_3-(CH_2)_5-\underset{\underset{CH_3}{\mid}}{\overset{\overset{CH_3}{\mid}}{C}}-CH_2-O-\underset{\underset{NH-CH_2-CH=CH_2}{\mid}}{\overset{\overset{O}{\parallel}}{P}}-O-CH=CCl_2$ (XVII₁) | 10,000<br>3,000<br>1,000<br>300<br>100<br>30<br>10 | 100<br>100<br>100<br>>50<br>>50<br>0<br>— | 100<br>100<br>100<br>>50<br>>50<br><50<br>0 | >50<br><50<br><50<br>0<br>—<br>—<br>— |
| $CH_3-(CH_2)_4-O-\underset{\underset{CH_3-(CH_2)_2-NH}{\mid}}{\overset{\overset{O}{\parallel}}{P}}-O-CH=CCl_2$ (XVIII₁) | 10,000<br>3,000<br>1,000<br>300<br>100<br>30<br>10<br>3<br>1 | 100<br>>50<br>>50<br>>50<br>>50<br>>50<br><50<br>0<br>0 | 100<br>100<br>100<br>100<br>>50<br><50<br>0<br>0<br>0 | 100<br>100<br>>50<br>>50<br><50<br><50<br>0<br>0<br>0 |
| $CH_3-\underset{\underset{CH_3-(CH_2)_2-NH}{\mid}}{\overset{\overset{CH_3}{\mid}}{CH}}-O-\overset{\overset{O}{\parallel}}{P}-O-CH=CCl_2$ (XIX₁) | 10,000<br>3,000<br>1,000<br>300<br>100<br>30<br>10 | 100<br>100<br>100<br><50<br>0<br>0<br>0 | 100<br>100<br>>50<br>0<br>0<br>0<br>0 | 100<br>100<br>>50<br>0<br>0<br>0<br>0 |
| $CH_3-(CH_2)_4-O-\underset{\underset{(CH_3)_2N}{\mid}}{\overset{\overset{O}{\parallel}}{P}}-O-CH=CCl_2$ (XX₁) | 10,000<br>3,000<br>1,000<br>300<br>100<br>30<br>10 | 100<br>100<br>>50<br>>50<br>0<br>0<br>0 | 100<br>100<br>100<br>>50<br>0<br>0<br>0 | >50<br>>50<br><50<br>0<br>0<br>0<br>0 |
| $CH_3-(CH_2)_2-O-\underset{\underset{CH_3-NH}{\mid}}{\overset{\overset{O}{\parallel}}{P}}-O-CH=CCl_2$ (XXI₁) | 10,000<br>3,000<br>1,000<br>300<br>100<br>30<br>10 | 100<br>100<br>100<br>100<br>>50<br><50<br>0 | >50<br>>50<br>>50<br>0<br>0<br>0<br>0 | 100<br>>50<br><50<br>0<br>0<br>0<br>0 |
| $CH_3-(CH_2)_4-O-\underset{\underset{CH_3-NH}{\mid}}{\overset{\overset{O}{\parallel}}{P}}-O-CH=CCl_2$ (XXII₁) | 10,000<br>3,000<br>1,000<br>300<br>100<br>30<br>10 | 100<br>100<br>100<br>100<br>>50<br><50<br>0 | 100<br>100<br>100<br>100<br>>50<br>>50<br>0 | 100<br>100<br>100<br>>50<br>>50<br><50<br>0 |
| $CH_3-(CH_2)_5-O-\underset{\underset{CH_3-NH}{\mid}}{\overset{\overset{O}{\parallel}}{P}}-O-CH=CCl_2$ (XXIII₁) | 10,000<br>3,000<br>1,000<br>300<br>100<br>30<br>10<br>3 | 100<br>100<br>100<br>100<br>100<br>>50<br><50<br>0 | 100<br>100<br>100<br>100<br>100<br>>50<br>0<br>0 | 100<br>100<br>100<br>100<br>>50<br><50<br>0<br>0 |
| $CH_3-(CH_2)_7-O-\underset{\underset{CH_3-NH}{\mid}}{\overset{\overset{O}{\parallel}}{P}}-O-CH=CCl_2$ (XXIV₁) | 10,000<br>3,000<br>1,000<br>300<br>100<br>30<br>10<br>3 | 100<br>100<br>100<br>100<br>>50<br>>50<br><50<br>0 | 100<br>100<br>100<br>>50<br><50<br>0<br>0<br>0 | 100<br>100<br>100<br>>50<br><50<br>0<br>0<br>0 |
| $CH_3-(CH_2)_3-O-\underset{\underset{CH_2=CH-CH_2-NH}{\mid}}{\overset{\overset{O}{\parallel}}{P}}-O-CH=CCl_2$ (XXV₁) | 10,000<br>3,000<br>1,000<br>300<br>100<br>30<br>10<br>3 | 100<br>100<br>100<br>>50<br>>50<br><50<br><50<br>0 | 100<br>100<br>100<br>>50<br>>50<br><50<br>0<br>0 | 100<br>100<br>>50<br><50<br>0<br>0<br>0<br>0 |
| $CH_3-(CH_2)_4-O-\underset{\underset{CH_2=CH-CH_2-NH}{\mid}}{\overset{\overset{O}{\parallel}}{P}}-O-CH=CCl_2$ (XXVI₁) | 10,000<br>3,000<br>1,000<br>300<br>100<br>30<br>10<br>3 | 100<br>100<br>100<br>100<br>100<br>>50<br><50<br>0 | 100<br>100<br>100<br>>50<br><50<br>0<br>0<br>0 | 100<br>100<br>>50<br>0<br>0<br>0<br>0<br>0 |
| $C_6H_5-CH_2-O-\underset{\underset{CH_2=CH-CH_2-NH}{\mid}}{\overset{\overset{O}{\parallel}}{P}}-O-CH=CCl_2$ (XXVII₁) | 10,000<br>3,000<br>1,000<br>300<br>100<br>30<br>10 | —<br>—<br>—<br>—<br>—<br>—<br>— | 100<br>100<br>100<br>100<br>100<br>100<br>— | 100<br>100<br>100<br>100<br>100<br>100<br>— |
| $C_6H_5-(CH_2)_2-O-\underset{\underset{CH_2=CH-CH_2-NH}{\mid}}{\overset{\overset{O}{\parallel}}{P}}-O-CH=CCl_2$ (XXVIII₁) | 10,000<br>3,000<br>1,000<br>300<br>100<br>30<br>10 | —<br>—<br>—<br>—<br>—<br>—<br>— | 100<br>100<br>100<br>100<br>>50<br>>50<br>— | 100<br>>50<br>>50<br><50<br><50<br>0<br>— |

TABLE 11—Continued

Inhibition of the depositing of eggs in the case of *Boophilus microplus* (in percent)—Continued

| Active compound | Concentration of active compound in p.p.m. | Sensitive strain | Ridgeland strain | Biarra strain |
|---|---|---|---|---|
| (XXIX₁) C₆H₅—(CH₂)₃—O—P(=O)(O—CH=CCl₂)—NH—CH₂—CH=CH₂ | 10,000<br>3,000<br>1,000<br>300<br>100<br>30<br>10 | | 100<br>100<br>>50<br>>50<br><50<br>0 | >50<br>>50<br><50<br><50<br>0<br>0 |
| (XXX₁) C₆H₅—CH₂—O—P(=O)(O—CH=CCl₂)—NH—CH₂—CH=CH₂ | 10,000<br>3,000<br>1,000<br>300<br>100<br>30<br>10 | 100<br>100<br>100<br>>50<br>>50<br><50<br>0 | 100<br>100<br>100<br>100<br>>50<br><50<br>0 | 100<br>>50<br>>50<br>>50<br>>50<br><50<br>0 |
| (XXXI₁) cyclohexyl-CH₂—O—P(=O)(O—CH=CCl₂)—NH—CH₂—CH=CH₂ | 10,000<br>3,000<br>1,000<br>300<br>100<br>30<br>10 | 100<br>100<br>100<br>100<br>100<br><50 | 100<br>100<br>100<br>100<br>100<br>>50 | 100<br>100<br>100<br>100<br>100<br><50 |
| (XXXII₁) CH₃—(CH₂)₅—O—P(=O)(O—CH=CCl₂)—NH—CH₂—CH=CH₂ | 10,000<br>3,000<br>1,000<br>300<br>100<br>30<br>10<br>3<br>1 | 100<br>100<br>100<br>100<br>100<br>>50<br>>50<br><50<br>0 | 100<br>100<br>100<br>100<br>100<br><50<br><50<br>0<br>0 | 100<br>100<br>100<br>100<br>100<br>>50<br>0<br>0<br>0 |
| (XXXIII₁) cyclohexyl-O—P(=O)(O—CH=CCl₂)—NH—CH₂—CH=CH₂ | 10,000<br>3,000<br>1,000<br>300<br>100<br>30<br>10 | 100<br>100<br>100<br>100<br>>50<br>>50<br>0 | 100<br>100<br>100<br>100<br>>50<br><50<br>0 | 100<br>>50<br>>50<br>>50<br><50<br><50 |
| (XXXIV₁) 2-CH₃-cyclohexyl-O—P(=O)(O—CH=CCl₂)—NH—CH₂—CH=CH₂ | 10,000<br>3,000<br>1,000<br>300<br>100<br>30<br>10 | 100<br>100<br>100<br>>50<br>>50<br>>50 | 100<br>100<br>100<br>100<br>>50<br>>50 | >50<br>>50<br><50<br><50<br>0<br>0 |
| (XXXV₁) 3-CH₃-cyclohexyl-O—P(=O)(O—CH=CCl₂)—NH—CH₂—CH=CH₂ | 10,000<br>3,000<br>1,000<br>300<br>100<br>30<br>10 | 100<br>100<br>100<br>>50<br>>50<br>>50 | 100<br>100<br>100<br>100<br>100<br>>50 | 0<br>100<br>10<br>100<br>>50<br><50<br><50<br>0 |
| (XXXVI₁) 4-CH₃-cyclohexyl-O—P(=O)(O—CH=CCl₂)—NH—CH₂—CH=CH₂ | 10,000<br>3,000<br>1,000<br>300<br>100<br>30<br>10 | 100<br>100<br>100<br>>50<br>>50<br>>50 | 100<br>100<br>100<br>100<br>100<br>>50 | 100<br>100<br>>50<br><50<br>0<br>0 |
| (XXXVII₁) CH₃—CH₂—CH(CH₃)—O—P(=O)(O—CH=CCl₂)—NH—CH₂—CH=CH₂ | 10,000<br>3,000<br>1,000<br>300<br>100<br>30<br>10 | | 100<br>100<br>>50<br>>50<br>>50<br><50<br>0 | >50<br><50<br><50<br><50<br>0<br>0<br>0 |
| (XXXVIII₁) CH₃—CH₂—CH(CH₂CH₃)—CH₂—O—P(=O)(O—CH=CCl₂)—NH—CH₂—CH=CH₂ | 10,000<br>3,000<br>1,000<br>300<br>100<br>30<br>10 | | 100<br>100<br>100<br>100<br>100<br>100 | 100<br>100<br>>50<br>>50<br>>50<br>>50 |

The following further examples illustrate the production process of the present invention:

EXAMPLE 12

(a)
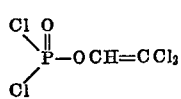
(III)

A mixture of 66.8 g. (0.3 mol) of O,O-dimethyl-O-(2,2-dichloro-vinyl)-phosphoric acid ester, 143 g. (1.2 mols) of thionyl chloride and 5 g. of dimethyl formamide is stirred for 3 hours at 75 to 80° C. The volatile constituents are then distilled off at about 50° C. under reduced pressure and the mixture is worked up as follows:

1.2 g. of water are added to the residue, with stirring and external cooling (ice water), and the reaction mixture is then distilled. 63.3 g. (91.8% of the theory) of a distillate of B.P. 60 to 63° C./2 mm. Hg are obtained which is yellowish colored and occasionally contains a slight crystal turbidity. The latter, however, does not interfere with further reactions. The refractive index of the O-(2,2-dichloro-vinyl)-phosphoric acid ester dichloride obtained is $n_D^{21}=1.4930$.

(b) 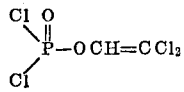
(III)

296 g. of O,O-dimethyl-O-(2,2-dichloro-vinyl)-phosphoric acid ester are heated to 110 to 120° C. and at this temperature there are added portionwise 560 g. of phosphorus pentachloride. The addition of each further portion is delayed until the preceding portion is largely reacted. The total time required for the addition is ½ to 1 hour. For the after-reaction, the mixture is then heated to 120 to 130° C. for a further 1 hour and, finally, the phosphorus oxychloride is distilled off under reduced pressure. The O-(2,2-dichloro-vinyl)-phosphoric acid ester dichloride comes over at 90° C./11 mm. Hg. The yield is 205 g. (66.5% of the theory).

*Analysis.* — Calculated for $C_2HO_2Cl_4P$ (molecular weight 229.84) (percent): Cl, 61.71; P, 13.48. Found (percent): Cl, 61.57; P, 13.31.

A further variant for the preparation of O-(2,2-dichloro-vinyl)-phosphoric acid ester dichloride consists in the addition of phosphorus trichloride instead of $PCl_5$ and simultaneous introduction of chlorine, i.e. in stoichiometrical amounts corresponding substantially to that of phosphorus pentachloride, with Example 12(b) being repeated otherwise in the same manner, whereby substantially the same result is achieved.

(c) 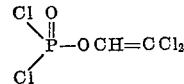
(III)

To a mixture of 83 g. of O,O-diethyl-O-(2,2-dichlorovinyl)-phosphoric acid ester and 5 to 10 drops of dimethyl formamide there are added portionwise, commencing at 95° C., 144 g. of phosphorus pentachloride. The temperature of the reaction mixture should be 120° C. at the end of the reaction. The mixture is then stirred for a further ½ hour at 120° C. Working up of the mixture takes place as described under Example 12(a). 42 g. (55% of the theory) of O-(2,2-dichlorovinyl)-phosphoric acid ester dichloride are obtained.

(d) A mixture of 45 g. of O,O-diethyl-O-(2,2-dichloro-vinyl)-phosphoric acid ester, 86 g. of thionyl chloride and 2.5 g. of dimethyl formamide is heated under reflux until the internal temperature of the mixture has reached 110° C. The mixture is then worked up by distillation and 17 g. (41% of the theory) of O-(2,2-dichloro-vinyl)-phosphoric acid ester dichloride are obtained.

(e) 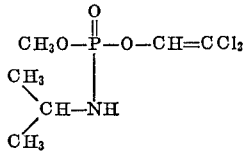
(IVa₁₁)

230 g. of O-(2,2-dichloro-vinyl)-phosphoric acid ester dichloride are dissolved in 1 liter of benzene. To this solution there is added dropwise at 5 to 6° C. a cold solution of 33 g. of methanol and 101 g. of triethylamine in 100 ml. of benzene. In order to complete the reaction, the reaction mixture is then stirred for a further ½ hour at room temperature. Thereafter the precipitate is filtered off with suction, washed with a little benzene, and the filtrate is added dropwise at 5 to 6° C. to a solution of 100 g. of triethylamine and 64 g. of isopropylamine in 1 liter of benzene. After completion of the addition, the mixture is stirred for a further ½ hour at room temperature, then the precipitate is filtered off with suction, the filtrate is washed with water until there is a neutral reaction, the organic layer is dried over sodium sulfate and then the solvent is distilled off in a vacuum. The residue boils at 106° C. under a pressure of 0.2 mm. Hg. After distillation, the O-methyl-N-isopropyl-O-(2,2-dichloro-vinyl)-phosphoric acid ester amide obtained has the refractive index $n_D^{20}=1.4672$. The yield is 167 g. (67% of the theory).

*Analysis.*—Calculated for $C_6H_{12}O_3Cl_2NP$ (molecular weight 248.06) (percent): Cl, 28.59; N, 5.65; P, 12.48. Found (percent): Cl, 28.86; N, 5.83; P, 12.51.

EXAMPLE 13

According to the method described above in Example 12, there can also be obtained the 2,2-dichloro-vinyl-phosphoric acid ester amides of the constitution $$\begin{array}{c} RO \\ R_1 \end{array} \!\!\! \begin{array}{c} O \\ \| \\ P-OCH=CCl_2 \\ / \\ N \\ | \\ R_2 \end{array} \qquad (Ia)$$

in which R, $R_1$ and $R_2$ are as listed in the following Table A. The yields stated are not striking. With appropriate conduct of the process, however, they can, almost without exception, be increased to about 70%.

TABLE A

| R | $R_1$ | $R_2$ | B.P. (° C./mm. Hg) | Refractive index [$n_D^{20}$] | Yield [percent of the theory] |
|---|---|---|---|---|---|
| $CH_3$ | $CH_3$— | H | B.P. 102/0.01 | $n_D^{28}$ 1.4713 | 54.5 |
| $CH_3$ | $CH_2=CH-CH_2$— | H | B.P. 145/0.1 | 1.4845 | 43.5 |
| $CH_3$ | —⟨H⟩— | H | M.P. 64 | | 51.5 |
| $CH_3$ | Cl—⟨ ⟩— | H | | 1.5546 | 68.0 |
| $CH_3$ | $C_2H_5$— | $C_2H_5$— | B.P. 95/0.05 | 1.4659 | 46.0 |
| $CH_3$ | $nC_3H_7$— | $nC_3H_7$— | B.P. 103-105/0.01 | 1.4638 | 34.5 |
| $CH_3$ | $nC_4H_9$— | $nC_4H_9$— | | 1.4615 | 76.0 |

EXAMPLE 14

According to the method described above in Example 12, there can also be obtained the 2,2-dichlorovinyl-phosphoric acid ester amides of the Formula Ia given in Example 13 in which R, $R_1$ and $R_2$ are as listed in the following Table B.

TABLE B

| R | $R_1$ | $R_2$ | B.P. at 0.01 mm. Hg [° C.] | Refractive index [$n_D^{20}$] | Yield [percent of the theory] |
|---|---|---|---|---|---|
| $CH_3$ | phenyl | $CH_3$ | | 1.5472 | 90.0 |
| $CH_3$ | —$CH_2$—$CH_2$— | | 96 | 1.4831 | 50.0 |
| $CH_3$ | $CH_2$—$CH_2$—$CH_2$ / $CH_2$—$CH_2$ | | 110–115 | 1.4881 | 45.0 |
| $CH_3$— | $CH_2$—$CH_2$— / $CH_2$—O—$CH_2$ | | 115 | 1.4878 | 33.0 |
| phenyl | $CH_3$ | $CH_3$ | 116–118 | 1.5162 | 54.0 |
| phenyl | $C_2H_5$ | $C_2H_5$ | 135 | 1.5116 | 60.0 |
| phenyl | $n$-$C_3H_7$ | $n$-$C_3H_7$ | 138 | 1.5066 | 48.5 |
| phenyl | $n$-$C_4H_9$ | $n$-$C_4H_9$ | 158–160 | 1.5009 | 48.0 |
| phenyl | $CH_2$—$CH_2$— / $CH_2$—O—$CH_2$ | | 162 | 1.5291 | 51.5 |
| phenyl | $CH_2$—$CH_2$ / $CH_2$—O—$CH_2$ | | 160–162 | 1.5315 | 68.0 |
| $CH_3$ | H | H | | | 82.5 |
| $C_2H_5$ | H | H | | | 85.5 |
| $nC_3H_7$ | H | H | | 1.4872 | 70.0 |
| $nC_4H_9$ | H | H | | | 82.0 |
| $nC_5H_{11}$ | H | H | | | 75.5 |
| $iC_3H_7$ | H | H | | 1.4788 | 73.5 |
| $C_2H_5$ | $CH_3$ | H | 112 | 1.4678 | 83.0 |
| $nC_3H_7$ | $CH_3$ | H | 118 | 1.4678 | 84.0 |
| $nC_4H_9$ | $CH_3$ | H | 122 | 1.4676 | 81.0 |
| $nC_5H_{11}$ | $CH_3$ | H | 132 | 1.4678 | 78.0 |
| $nC_6H_{13}$ | $CH_3$ | H | 146 | 1.4665 | 64.5 |
| $nC_8H_{17}$ | $CH_3$ | H | 158 | 1.4671 | 79.0 |
| $iC_3H_7$ | $CH_3$ | H | 108 | 1.4650 | 78.0 |
| $CH_3$ | $C_2H_5$ | H | 101 | 1.4689 | 71.0 |
| $C_2H_5$ | $C_2H_5$ | H | 106 | 1.4659 | 78.5 |
| $nC_3H_7$ | $C_2H_5$ | H | 113 | 1.4653 | 73.0 |
| $nC_4H_9$ | $C_2H_5$ | H | 130–132 | 1.4652 | 72.5 |
| $nC_5H_{11}$ | $C_2H_5$ | H | 136–138 | 1.4649 | 64.5 |
| $iC_3H_7$ | $C_2H_5$ | H | 120 | 1.4631 | 71.0 |
| $CH_3$ | $nC_3H_7$ | H | 115 | 1.4689 | 65.0 |
| $C_2H_5$ | $nC_3H_7$ | H | 123 | 1.4665 | 79.0 |
| $nC_3H_7$ | $nC_3H_7$ | H | 131 | 1.4652 | 71.5 |
| $nC_4H_9$ | $nC_3H_7$ | H | 130 | 1.4652 | 81.0 |
| $nC_5H_{11}$ | $nC_3H_7$ | H | 138 | 1.4651 | 81.0 |
| $iC_3H_7$ | $nC_3H_7$ | H | 114 | 1.4635 | 75.5 |
| $CH_3$ | $nC_4H_9$ | H | 125 | 1.4696 | 67.0 |
| $C_2H_5$ | $nC_4H_9$ | H | 132 | 1.4650 | 74.0 |
| $C_2H_5$ | $iC_3H_7$ | H | 106 | 1.4638 | 73.5 |
| $nC_3H_7$ | $iC_3H_7$ | H | 112 | 1.4620 | 68.0 |
| $nC_4H_9$ | $iC_3H_7$ | H | 124 | 1.4616 | 72.5 |
| $nC_5H_{11}$ | $iC_3H_7$ | H | 136 | 1.4611 | 65.0 |
| $nC_6H_{13}$ | $iC_3H_7$ | H | 162 | 1.4632 | 54.0 |
| $CH_3$ | $CH_3$ | $CH_3$ | 68 | 1.4646 | 83.0 |
| $C_2H_5$ | $CH_3$ | $CH_3$ | 72 | 1.4624 | 79.5 |
| $nC_3H_7$ | $CH_3$ | $CH_3$ | 79 | 1.4607 | 81.5 |
| $nC_4H_9$ | $CH_3$ | $CH_3$ | 83 | 1.4612 | 82.5 |
| $nC_5H_{11}$ | $CH_3$ | $CH_3$ | 91 | 1.4594 | 78.5 |
| $iC_3H_7$ | $CH_3$ | $CH_3$ | 72 | 1.4588 | 80.0 |
| $C_2H_5$ | $CH_2$—$CH_2$ | | 86 | 1.4753 | 70.5 |
| $nC_3H_7$ | $CH_2$—$CH_2$ | | 91 | 1.4736 | 72.0 |
| $nC_4H_9$ | $CH_2$—$CH_2$ | | 100 | 1.4736 | 77.0 |
| $nC_5H_{11}$ | $CH_2$—$CH_2$ | | 120 | 1.4730 | 65.0 |
| $nC_6H_{13}$ | $CH_2$—$CH_2$ | | 140 | 1.4778 | 35.5 |
| $nC_8H_{17}$ | $CH_2$—$CH_2$ | | 150 | 1.4732 | 47.5 |

TABLE B—Continued

| R | R₁ | R₂ | B.P. at 0.01 mm. Hg [°C.] | Refractive index [$n_D^{20}$] | Yield [percent of the theory] |
|---|---|---|---|---|---|
| CH₃O—CH₂—CH(CH₃)— | —CH₂—CH₂— | | 118 | 1.4828 | 53.5 |
| C₂H₅O—CH₂—CH(CH₃)— | —CH₂—CH₂— | | 123 | 1.4771 | 53.5 |
| CH₃— | —CH₂—CH₂—CH₂—CH₂— (cyclobutyl) | | 95 | 1.4849 | 67.0 |
| C₂H₅— | —CH₂—CH₂—CH₂—CH₂— | | 104 | 1.4808 | 63.0 |
| nC₃H₇— | —CH₂—CH₂—CH₂—CH₂— | | 104 | 1.4792 | 80.5 |
| nC₄H₉— | —CH₂—CH₂—CH₂—CH₂— | | 114 | 1.4750 | 74.0 |
| nC₅H₁₁— | —CH₂—CH₂—CH₂—CH₂— | | 136 | 1.4745 | 74.0 |
| iC₃H₇— | —CH₂—CH₂—CH₂—CH₂— | | 96 | 1.4750 | 68.5 |
| C₂H₅— | CH₂=CH—CH₂— | H | 126 | 1.4774 | 73.5 |
| nC₃H₇— | CH₂=CH—CH₂— | H | 126 | 1.4768 | 75.0 |
| nC₄H₉— | CH₂=CH—CH₂— | H | 135 | 1.4739 | 77.5 |
| nC₅H₁₁— | CH₂=CH—CH₂— | H | 142 | 1.4713 | 77.5 |
| nC₆H₁₃— | CH₂=CH—CH₂— | H | 146 | 1.4713 | 62.5 |
| nC₈H₁₇— | CH₂=CH—CH₂— | H | 168 | 1.4723 | 69.5 |
| CH₃O—CH₂—CH₂— | CH₂=CH—CH₂— | H | 146 | 1.4806 | 73.5 |
| C₂H₅O—CH₂—CH₂— | CH₂=CH—CH₂— | H | 152 | 1.4778 | 69.5 |

EXAMPLE 15

According to the method described in Example 12, there can also be obtained the 2,2-dichlorovinyl-phosphoric acid ester amides of the Formula Ia given in Example 13 in which R, R₁ and R₂ are as listed in the following Table C.

TABLE C

| R | R₁ | R₂ | B.P. (°C./mm. Hg) | Refractive index $n_D^{20}$ | Yield percent of theory |
|---|---|---|---|---|---|
| CH₃—CH₂—C(CH₃)₂—CH₂— | CH₃ | H | 129/0.01 | 1.4660 | 66.5 |
| CH₃—CH₂—CH(C₂H₅)—CH₂— | CH₃ | H | 150/0.2 | 1.4671 | 69.0 |
| CH₃—(CH₂)₃—CH(C₂H₅)—CH₂— | CH₃ | H | 148/0.01 | 1.4660 | 48.5 |
| CH₃—(CH₂)₃C(CH₃)₂—CH₂— | CH₃ | H | 160/0.02 | 1.4652 | 61.5 |
| CH₃—(CH₂)₅—C(CH₃)₂—CH₂— | CH₃ | H | 182/0.01 | 1.4654 | 39.0 |
| C₆H₅—O—CH₂—CH₂— | CH₃ | H | 190/0.01 | 1.5275 | 57.0 |
| Cl—(2-methylphenyl)— | CH₃ | H | Slightly distilled. | 1.5368 | 76.0 |
| C₆H₅—CH₂—CH₂— | CH₃ | H | 170/0.01 | 1.5250 | 73.5 |
| C₆H₅—CH₂—CH₂—CH₂— | CH₃ | H | 187/0.01 | 1.5238 | 61.0 |
| cyclohexyl | CH₃ | H | M.P. 63 | | 69.5 |
| cyclohexyl—CH₂— | CH₃ | H | M.P. 55 | | 56.0 |
| CH₃—CH₂—C(CH₃)₂—CH₂— | C₂H₅ | H | 136/0.01 | 1.4653 | 79.5 |
| CH₃—CH₂—CH(C₂H₅)—CH₂— | C₂H₅ | H | 147/0.01 | 1.4659 | 76.0 |
| CH₃—(CH₂)₅—CH₂— | C₂H₅ | H | 152/0.01 | 1.4632 | 69.0 |
| CH₃—(CH₂)₆—CH₂— | C₂H₅ | H | 165/0.01 | 1.4638 | 77.0 |
| CH₃—(CH₂)₄CH₂— | C₂H₅ | H | 156/0.01 | 1.4630 | 71.0 |
| cyclohexyl | C₂H₅ | H | Slightly distilled. | 1.4878 | 56.0 |
| Cl—CH₂—CH₂— | C₂H₅ | H | 148/0.1 | 1.4850 | 70.0 |
| Cl₃C—CH₂— | C₂H₅ | H | 155/0.01 | 1.4956 | 59.5 |
| C₆H₅— | C₂H₅ | H | 165/0.01 | 1.5231 | 67.5 |

TABLE C—Continued

| R | R₁ | R₂ | B.P. (° C./mm. Hg) | Refractive index $n_D^{20}$ | Yield percent of the theory |
|---|---|---|---|---|---|
| 4-CH₃-cyclohexyl (CH₃, H on ring) | C₂H₅ | H | Slightly distilled. | 1.4848 | 74.5 |
| Phenyl-CH₂— | C₂H₅ | H | Slightly distilled. | 1.5265 | 51.0 |
| Phenyl-CH₂-CH₂— | C₂H₅ | H | 175/0.01 | 1.5227 | 70.5 |
| Phenyl-CH₂-CH₂-CH₂— | C₂H₅ | H | 180/0.01 | 1.5182 | 59.0 |
| Phenyl-O-CH₂-CH₂— | C₂H₅ | H | 178/0.01 | 1.5191 | 62.0 |
| CH₃—CH₂—C(CH₃)₂—CH₂— | n-C₃H₇ | H | 142/0.02 | 1.4640 | 64.0 |
| CH₃—CH₂—CH(C₂H₅)—CH₂— | n-C₃H₇ | H | 145/0.02 | 1.4656 | 74.5 |
| (CH₃)₂CH— | CH₂=CH—CH₂ | H | 128/0.4 | 1.4720 | 73.0 |
| H₂C=CH—CH₂— | CH₂=CH—CH₂ | H | 130/0.05 | 1.4851 | 48.5 |
| H₃C—CH₂—(CH₃)CH— | CH₂=CH—CH₂ | H | 118/0.01 | 1.4730 | 76.0 |
| H₃C—CH₂C(CH₃)₂—CH₂— | CH₂=CH—CH₂ | H | 142/0.01 | 1.4726 | 76.0 |
| H₃C—CH₂—CH(C₂H₅)—CH₂— | CH₂=CH—CH₂ | H | 142/0.01 | 1.4730 | 77.0 |
| H₃C—(CH₂)₃C(CH₃)₂—CH₂— | CH₂=CH—CH₂ | H | 158/0.01 | 1.4701 | 66.5 |
| H₃C(CH₂)₄CH₂C(CH₃)₂—CH₂— | CH₂=CH—CH₂ | H | Slightly distilled. | 1.4701 | 64.5 |
| H₃C(CH₂)₈—CH₂— | CH₂=CH—CH₂ | H | 182/0.1 | 1.4708 | 80.5 |
| H₃C(CH₂)₇—C(CH₃)₂—CH₂— | CH₂=CH—CH₂ | H | 186/0.05 | 1.4689 | 76.5 |
| H₃C(CH₂)₁₀—CH₂— | CH₂=CH—CH₂ | H | 192/0.01 | 1.4710 | 81.0 |
| H₃C—CH₂—CH₂—O—CH₂—CH₂— | CH₂=CH—CH₂ | H | 140/0.01 | 1.4735 | 81.5 |
| H₃C—(CH₂)₃—O—CH₂—CH₂— | CH₂=CH—CH₂ | H | 166/0.01 | 1.4721 | 75.0 |
| Cl—CH₂—CH₂— | CH₂=CH—CH₂ | H | 144/0.05 | 1.4940 | 71.5 |
| Cl₃C—CH₂— | CH₂=CH—CH₂ | H | 166/0.05 | 1.5039 | 67.0 |
| cyclohexyl (H) | CH₂=CH—CH₂ | H | Slightly distilled. | 1.4938 | — |
| 4-CH₃-cyclohexyl | CH₂=CH—CH₂ | H | 180/0.05 | 1.4919 | 68.5 |
| 3-CH₃-cyclohexyl | CH₂=CH—CH₂ | H | 167/0.05 | 1.4890 | 76.0 |
| 4-CH₃-cyclohexyl (alt) | CH₂=CH—CH₂ | H | 176/0.05 | 1.4899 | 76.0 |
| Phenyl-CH₂— | CH₂=CH—CH₂ | H | 165/0.01 | 1.5039 | 77.5 |
| cyclohexyl-CH₂— | CH₂=CH—CH₂ | H | 165/0.01 | 1.4941 | 79.5 |
| Phenyl-CH₂— (aromatic) | CH₂=CH—CH₂ | H | Slightly distilled. | 1.5315 | 68.0 |
| Phenyl-CH₂-CH₂— | CH₂=CH—CH₂ | H | 172/0.01 | 1.5252 | 74.0 |
| Phenyl-CH₂-CH₂-CH₂— | CH₂=CH—CH₂ | H | 194/0.01 | 1.5241 | 57.0 |
| Phenyl | CH₂=CH—CH₂ | H | 162/0.01 | 1.5298 | 74.5 |
| CH₃-Phenyl | CH₂=CH—CH₂ | H | Slightly distilled. | 1.5262 | 80.5 |
| (H₃C)₃C-Phenyl | CH₂=CH—CH₂ | H | 186/0.01 | 1.5184 | 65.5 |
| Cl-Phenyl | CH₂=CH—CH₂ | H | 182/0.01 | 1.5365 | 85.5 |

TABLE C—Continued

| R | R₁ | R₂ | B.P. (° C./ mm. Hg) | Refractive index $n_D^{20}$ | Yield percent of the theory |
|---|---|---|---|---|---|
| 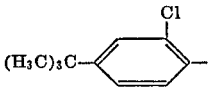 (H₃C)₃C—⟨Cl⟩— | CH₂=CH—CH₂— | H | 200/0.01 | 1.5269 | 64.5 |
| 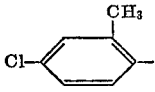 Cl—⟨CH₃⟩— | CH₂=CH—CH₂— | H | 190/0.05 | 1.5382 | 86.5 |
| 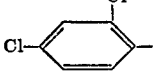 Cl—⟨Cl⟩— | CH₂=CH—CH₂— | H | 200/0.1 | 1.5449 | 58.0 |
| CH₃— | H₃CO—CH₂—CH₂— | H | 126/0.01 | 1.4732 | 72.0 |
| C₂H₅— | H₃CO—CH₂—CH₂— | H | 120/0.01 | 1.4652 | 72.0 |
| n-C₃H₇— | H₃CO—CH₂—CH₂— | H | 133/0.01 | 1.4689 | 84.5 |
| CH₂=CH—CH₂— | H₃CO—CH₂—CH₂— | H | 125/0.01 | 1.4801 | 48.0 |
| n-C₄H₉— | H₃CO—CH₂—CH₂— | H | 136/0.01 | 1.4673 | 81.0 |
| CH₃(CH₂)₄—CH₂— | H₃CO—CH₂—CH₂— | H | 165/0.01 | 1.4651 | 74.0 |
| CH₃(CH₂)₃—CH₂— | H₃CO—CH₂—CH₂— | H | 155/0.01 | 1.4665 | 80.5 |
| CH₃(CH₂)₆—CH₂— | H₃CO—CH₂—CH₂— | H | 180/0.01 | 1.4665 | 73.0 |
|  ⟨H⟩— | H₃CO—CH₂—CH₂— | H | Slightly distilled | 1.4871 | — |
| 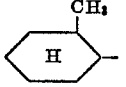 ⟨CH₃,H⟩— | H₃CO—CH₂—CH₂— | H | do | 1.4831 | 78.0 |
| 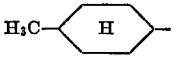 H₃C—⟨H⟩— | H₃CO—CH₂—CH₂— | H | 170/0.01 | 1.4837 | 78.5 |
| H₃CO—CH₂—CH₂— | H₃CO—CH₂—CH₂— | H | 170/0.05 | 1.4721 | 77.5 |
| H₅C₂O—CH₂—CH₂— | H₃CO—CH₂—CH₂— | H | 158/0.01 | 1.4695 | 67.0 |
| H₃CH₂CH₂CO—CH₂—CH₂— | H₃CO—CH₂—CH₂— | H | 168/0.1 | 1.4663 | 73.5 |
| H₃CH₂CH₂CO—CH₂—CH₂— | H₃CO—CH₂—CH₂— | H | 176/0.5 | 1.4666 | 71.5 |
| 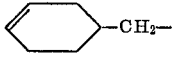 ⟨ ⟩—CH₂— | H₃CO—CH₂—CH₂— | H | 172/0.1 | 1.4953 | 46.5 |
| 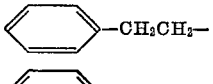 ⟨ ⟩—CH₂CH₂— | H₃CO—CH₂—CH₂— | H | Slightly distilled | 1.5189 | 79.0 |
| 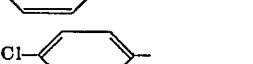 ⟨ ⟩—CH₂—CH₂—CH₂— | H₃CO—CH₂—CH₂— | H | 173/0.05 | 1.5157 | 53.5 |
| 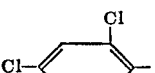 Cl—⟨ ⟩— | H₃CO—CH₂—CH₂— | H | 185/0.2 | 1.5296 | 45.5 |
|  Cl—⟨Cl⟩— | H₃CO—CH₂—CH₂— | H | Slightly distilled | 1.5428 | 73.0 |
| H₃C— | H₅C₂—S—CH₂—CH₂— | H | do | 1.5030 | 61.0 |
| H₅C₂— | H₅C₂—S—CH₂—CH₂— | H | 135/0.02 | 1.4989 | 68.5 |
| n-C₃H₇— | H₅C₂—S—CH₂—CH₂— | H | 160/0.02 | 1.4941 | 74.5 |
| H₃C(CH₂)₄—CH₂— | H₅C₂—S—CH₂—CH₂— | H | 182/0.02 | 1.4869 | 60.5 |
| H₃C(CH₂)₄—CH₂— | H₅C₂—S—CH₂—CN₂— | H | 168/0.01 | 1.4861 | 47.0 |
| 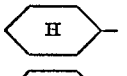 ⟨H⟩— | H₅C₂—S—CH₂—CH₂— | H | Slightly distilled | 1.5091 | 83.5 |
| 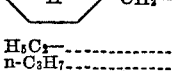 ⟨H⟩—CH₂— | H₅C₂—S—CH₂—CH₂— | H | 192/0.2 | 1.5068 | 82.0 |
| H₅C₂— | H₅C₂— | H₅C₂— | 85/0.02 | 1.4612 | 68.5 |
| n-C₃H₇— | H₅C₂— | H₅C₂— | 98/0.02 | 1.4603 | 76.5 |
| i-C₃H₇— | H₅C₂— | H₅C₂— | 81/0.05 | 1.4572 | 67.5 |
| n-C₄H₉— | H₅C₂— | H₅C₂— | 101/0.05 | 1.4604 | 73.0 |
| n-C₅H₁₁— | H₅C₂— | H₅C₂— | 118/0.05 | 1.4602 | 69.5 |

Advantageously, in accordance with the present invention, in the foregoing formulae:

R represents

Straight and branched alkyl, including alkyl having 1–12 carbon atoms, especially lower alkyl, more especially $C_{1-4}$ alkyl, such as methyl, ethyl, n- and iso-propyl, n-, iso-, sec.- and tert.-butyl, n- and iso-amyl (pentyl), n- and iso-hexyl, heptyl, n- and iso-octyl, nonyl, decyl, undecyl, dodecyl, and the like, and particularly methyl;

Straight and branched alkenyl, including alkenyl having 2–12 carbon atoms, especially lower alkenyl, more especially $C_{2-4}$ alkenyl, such as vinyl, α-, β- and γ-allyl, but-1-enyl, but-2-enyl, but-3-enyl, 2-methyl-prop-2-enyl (methallyl), 2 - methyl - prop - 1 - enyl(isobutenyl), 1 - methyl - prop - 2 - enyl, 1 - methyl - prop - 1 - enyl, pentenyl, hexenyl, heptenyl, octenyl, nonenyl, decenyl, undecenyl, dodecenyl, and the like, and particularly allyl;

Such alkyl and alkenyl as defined above which are substituted with 1–3 chloro groups; a lower alkoxy group, especially $C_{1-4}$ alkoxy, such as methoxy, ethoxy, n- and isopropoxy, n-, iso-, sec.- and tert.-butoxy, and the like; and a phenoxy group; including especially 1–3 chloro-lower alkyl, more especially 1–3 chloro-$C_{1-4}$ alkyl, $C_{1-4}$ alkoxy-lower alkyl, more especially $C_{1-4}$ alkoxy-$C_{1-4}$ alkyl, phenoxy-lower alkyl, more especially phenoxy-$C_{1-4}$ alkyl, 1–3 chloro-lower alkenyl, more especially 1–3 chloro-$C_{2-4}$ alkenyl, $C_{1-4}$ alkoxy-lower alkenyl, more especially $C_{1-4}$ alkoxy-$C_{2-4}$ alkenyl, phenoxy-lower alkenyl, more especially phenoxy-$C_{2-4}$ alkenyl; and the like;

Cycloalkyl, including cycloalkyl having 5–6 ring carbon atoms, such as cyclopentyl, cyclohexyl, and the like, especially cyclohexyl;

Such cycloalkyl as defined above which is substituted with lower alkyl as defined above, especially $C_{1-4}$ alkyl, such as methyl to tert.-butyl, inclusive, as defined above, -substituted $C_{5-6}$ cycloalkyl, and the like;

Cycloalkyl-substituted lower alkyl, including $C_{5-6}$ cycloalkyl as defined above, -substituted lower alkyl as defined above, especially $C_{5-6}$ cycloalkyl-substituted $C_{1-4}$ alkyl, such as methyl to tert.-butyl, inclusive, as defined above, and the like;

Cycloalkenyl-substituted lower alkyl, including cycloalkenyl having 5–6 ring carbon atoms, such as cyclopentenyl, cyclohexenyl, and the like, especially cyclohexenyl, -substituted lower alkyl as defined above, more especially $C_{5-6}$ cycloalkenyl-substituted $C_{1-4}$ alkyl, such as methyl to tert.-butyl, inclusive, as defined above, and the like;

Aryl, including aryl having 6–10 ring carbon atoms, such as phenyl, naphthyl, and the like;

Such aryl as defined above which is substituted with 1–3 chloro and/or lower alkyl as defined above, especially 1–3 chloro and/or lower alkyl-substituted, more especially 1–3 chloro and/or $C_{1-4}$ alkyl, such as methyl to tert.-butyl, inclusive, as defined above, -substituted $C_{6-10}$ aryl, and particularly phenyl and naphthyl, and the like;

Aralkyl, including $C_{6-10}$ aryl as defined above, -substituted lower alkyl as defined above, especially $C_{6-10}$ aryl, more especially phenyl and naphthyl, -substituted lower alkyl, more especially $C_{1-4}$ alkyl, such as methyl to tert.-butyl, inclusive, as defined above, and the like; and $R_1$ and $R_2$ each respectively represents hydrogen;

Alkyl, including lower alkyl as defined above for R, especially $C_{1-4}$ alkyl, such as methyl to tert.-butyl, inclusive, and the like;

Alkenyl, including lower alkenyl as defined above for R, especially $C_{2-4}$ alkenyl, such as vinyl to 1-methyl-prop-1-enyl, inclusive, and the like, and particularly $C_{3-4}$ alkenyl;

Such alkyl and alkenyl as defined above which are substituted with lower alkoxy as defined above, including $C_{1-4}$ alkoxy, such as methoxy to tert.-butoxy inclusive as defined above, or lower alkylmercapto, including $C_{1-4}$ alkyl, such as methyl to tert.-butyl inclusive, as defined above, mercapto, including especially $C_{1-4}$ alkoxy-lower alkyl, more especially $C_{1-4}$ alkoxy-$C_{1-4}$ alkyl, $C_{1-4}$ alkylmercapto-lower alkyl, more especially $C_{1-4}$ alkylmercapto-$C_{1-4}$ alkyl, $C_{1-4}$ alkoxy-lower alkenyl, more especially $C_{1-4}$ alkoxy-$C_{2-4}$ alkenyl, $C_{1-4}$ alkylmercapto-lower alkenyl, more especially $C_{1-4}$ alkylmercapto-$C_{2-4}$ alkenyl, and the like;

Cycloalkyl, including $C_{5-6}$ cycloalkyl as defined above for R, especially cyclohexyl, and the like;

Aryl, including $C_{6-10}$ aryl as defined above for R, especially phenyl and naphthyl, and the like;

Such aryl as defined above which is substituted with 1–3 chloro groups, especially 1–3 chloro-substituted phenyl, and the like;

With the proviso that $R_1$ and $R_2$ when taken together with the adjacent N atom represent A heterocyclic ring system, such as heterocyclic having 3–6 members including as hetero linking atom at least said adjacent N atom and at most said N atom and an O atom, especially in which the corresponding $R_1$ and $R_2$ combined moiety is $C_{2-5}$ polymethylene, i.e. —$(CH_2)_{2-5}$—, or $C_{2-5}$ polymethylene interrupted by an O linking atom, e.g. $C_{2-5}$ oxa-polymethylene, i.e.

$$-(CH_2)_m-O-(CH_2)_n-$$

where $n+m=1$ to 4 and preferably $n$ and $m$ each respectively is at least 1 and at most 3 and more especially $n$ and $m$ each is 2, including such heterocyclic rings as ethylene imino, piperidino, morpholino, and the like.

With respect to the new compounds of the present invention, the Formula I',

R is the same as defined above;

$R_3$ is hydrogen;

$R_4$ is the same as defined above for $R_2$;

With the proviso that $R_3$ and $R_4$ when taken together with the adjacent N atom represent a heterocyclic ring system corresponding to that defined above for $R_1$ and $R_2$ when taken together with said adjacent N atom, and especially ethylene imino, piperidino, morpholino, and the like.

It will be realized by the artisan that all of the foregoing compounds contemplated by the present invention, i.e. produced by the instant process, possess the desired strong and selective arthropodicidal, especially insecticidal and acaricidal, properties for combating arthropods, as well as a comparatively low toxicity toward warm-blooded creatures and a concomitantly low phytotoxicity, enabling such compounds to be used with corresponding favorable compatibility with warm-blooded creatures and plants for more effective control and/or elimination of insects and for acarids by application of such compounds to such arthropods and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. 2,2-dichloro-vinyl-phosphoric acid ester amide having the formula

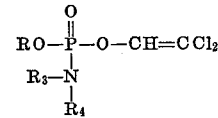

in which R is selected from the group consisting of $C_{1-12}$ alkyl; $C_{2-12}$ alkenyl; such alkyl and alkenyl which is substituted with substituents selected from the group consisting of lower alkoxy, phenoxy and 1–3 chloro; $C_{5-6}$ cycloalkyl; lower alkyl substituted $C_{5-6}$ cycloalkyl; $C_{5-6}$ cycloalkyl-lower alkyl; $C_{5-6}$ cycloalkenyl-lower alkyl; $C_{6-10}$ aryl; such aryl which is substituted with substituents selected from the group consisting of lower alkyl, 1–3 chloro, and mixtures of such alkyl and chloro substituents; and $C_{6-10}$ aryl-substituted lower alkyl; $R_3$ is hydrogen; and $R_4$ is selected from the group consisting of hydrogen; lower alkyl; lower alkenyl; such alkyl and alkenyl which is substituted with a substituent selected from the group consisting of lower alkoxy and lower alkylmercapto; $C_{5-6}$ cycloalkyl; $C_{6-10}$ aryl; and such aryl which is substituted with 1–3 chloro.

2. Amide according to claim 1 wherein R is selected from the group consisting of $C_{1-12}$ alkyl; lower alkenyl; lower alkoxy-lower alkyl; phenoxy-lower alkyl; 1–3 chloro-substituted lower alkyl; $C_{5-6}$ cycloalkyl; $C_{1-4}$ alkyl-substituted $C_{5-6}$ cycloalkyl; $C_{5-6}$ cycloalkyl-substituted $C_{1-4}$ alkyl; $C_{5-6}$ cycloalkenyl-substituted $C_{1-4}$ alkyl; phenyl; phenyl which is substituted with substituents selected from the group consisting of $C_{1-4}$ alkyl, 1–3 chloro, and mixtures of such alkyl and chloro substituents; and phenyl-substituted $C_{1-4}$ alkyl; $R_3$ is hydrogen; and $R_4$ is selected from the group consisting of hydrogen; $C_{1-4}$ alkyl; $C_{2-4}$ alkenyl; $C_{1-4}$ alkoxy-substituted $C_{1-4}$ alkyl; $C_{1-4}$ alkylmercapto-substituted $C_{1-4}$ alkyl; $C_{5-6}$ cycloalkyl; and 1-3 chloro-substituted phenyl.

3. Amide according to claim 1, wherein such amide is O - methyl-N-methyl-O-(2,2-dichloro-vinyl)-phosphoric acid ester amide.

4. Amide according to claim 1, wherein such amide is O - methyl-N-isopropyl-O-(2,2-dichloro-vinyl)-phosphoric acid ester amide.

5. Amide according to claim 1, wherein such amide is O-methyl - N - allyl-O-(2,2-dichloro-vinyl)phosphoric acid ester amide.

6. Amide according to claim 1, wherein such amide is O - methyl-N-cyclohexyl-O-(2,2-dichloro-vinyl)-phosphoric acid ester amide.

7. Amide according to claim 1, wherein such amide is O - methyl-N-diethyl-O-(2,2-dichloro-vinyl)-phosphoric acid ester amide.

8. Amide according to claim 1, wherein such amide is O - phenyl-N-dimethyl-O-(2,2-dichloro-vinyl) - phosphoric acid ester amide.

9. Amide according to claim 1, wherein such amide is O-phenyl - N - diethyl-O-(2,2-dichloro-vinyl)-phosphoric acid ester amide.

References Cited
UNITED STATES PATENTS 2,861,912   11/1958   Sallmann _____ 260—957 X

OTHER REFERENCES

Abramov et al., "Chemical Abstracts," vol. 54 (1960) 22329g.

JOSEPH REBOLD, Primary Examiner

A. H. SUTTO, Assistant Examiner

U.S. Cl. X.R.

260—239 EP, 243 B, 244 R, 247.7, 254, 294.7, 308 R, 308 H, 309.6, 315, 326.5, 326.11, 326.16, 454, 940, 948, 949, 950, 951, 954; 424—200, 202, 203, 210, 216, 217, 219

UNITED STATES PATENT OFFICE
CERTIFICATE OF CORRECTION

Patent No. 3,652,742    Dated March 28, 1972

Inventor(s) Wilhelm Sirrenberg, et al.

It is certified that error appears in the above-identified patent and that said Letters Patent are hereby corrected as shown below:

Col. 1, line 53

"R'G" should be --R'Cl--

Col. 4, line 22

"difficulty" should read --difficultly-- line 27

"(IIa)" should be --(IIba)--

Col. 10, line 57

"beetle" should be --beetle--

Col. 15, Table 4 first and second columns after first formula delete "0.01" and "100"

after second formula, change "1.0  100 / 0.01  95" to -- 0.1  100 --.

last formula, last figure in last column,

"100" should be --20--

PO-1050
(5/69)

UNITED STATES PATENT OFFICE
CERTIFICATE OF CORRECTION

Patent No. 3,652,742                    Dated March 28, 1972

Inventor(s)  Wilhelm Sirrenberg, et al.

It is certified that error appears in the above-identified patent and that said Letters Patent are hereby corrected as shown below:

Col. 34

Table B, 9th formula, second column

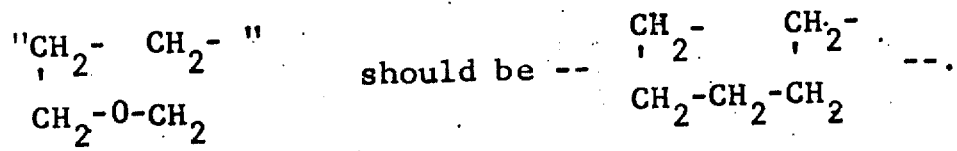

Signed and sealed this 11th day of July 1972.

(SEAL)
Attest:

EDWARD M. FLETCHER, JR.                ROBERT GOTTSCHALK
Attesting Officer                       Commissioner of Patents